US009355000B1

(12) United States Patent
Biswas et al.

(10) Patent No.: US 9,355,000 B1
(45) Date of Patent: May 31, 2016

(54) MODEL LEVEL POWER CONSUMPTION OPTIMIZATION IN HARDWARE DESCRIPTION GENERATION

(75) Inventors: Partha Biswas, Wayland, MA (US);
Zhihong Zhao, Newton, MA (US);
Wang Chen, Brookline, MA (US);
Yongfeng Gu, Brookline, MA (US)

(73) Assignee: THE MATHWORKS, INC., Natick, MA (US)

( * ) Notice: Subject to any disclaimer, the term of this patent is extended or adjusted under 35 U.S.C. 154(b) by 0 days.

(21) Appl. No.: 13/216,024

(22) Filed: Aug. 23, 2011

(51) Int. Cl.
*G06F 17/50* (2006.01)
*G06F 11/30* (2006.01)

(52) U.S. Cl.
CPC ........ *G06F 11/3062* (2013.01); *G06F 2217/78* (2013.01)

(58) Field of Classification Search
CPC ..................... G06F 2217/78; G06F 11/3062
USPC ............................................ 703/14; 716/109
See application file for complete search history.

(56) References Cited

U.S. PATENT DOCUMENTS

| | | |
|---|---|---|
| 5,164,724 A | 11/1992 | Hartley et al. |
| 5,555,201 A * | 9/1996 | Dangelo et al. ............. 716/102 |
| 5,586,325 A | 12/1996 | MacDonald et al. |
| 5,701,294 A | 12/1997 | Ward et al. |
| 5,764,951 A | 6/1998 | Ly et al. |
| 5,920,711 A | 7/1999 | Seawright et al. |
| 5,923,653 A | 7/1999 | Denton |
| 5,956,674 A | 9/1999 | Smyth et al. |
| 6,118,902 A | 9/2000 | Knowles |
| 6,128,025 A | 10/2000 | Bright et al. |
| 6,173,438 B1 | 1/2001 | Kodosky et al. |

(Continued)

FOREIGN PATENT DOCUMENTS

EP        1387260 A1        2/2004

OTHER PUBLICATIONS

Khouri et al., "Fast High-level Power Estimation for Control-flow Intensive Designs", 1998, International Symposium on Low Power Electronics and Design Proceedings, pp. 299-304.*

(Continued)

*Primary Examiner* — Kamini S Shah
*Assistant Examiner* — Juan Ochoa
(74) *Attorney, Agent, or Firm* — Cesari and McKenna, LLP; Michael R. Reinemann

(57) ABSTRACT

A system and method evaluates power information for a high-level model to be implemented in target hardware, and performs one or more power-reducing transmutations on the model. Transmutations may include moving one or more components from a fast rate region to a slow rate region, reducing bit width of data, signals, or other values, and replacing multiple instances of a resource with a shared instance of the resource. An in-memory representation of the model may be generated that reduces the model to a plurality of core components. A power score evaluation engine may assign power scores to the core components. Power scores may be retrieved from one or more power score database. The power scores may be non-dimensional scores representing power consumption relationships among the core components, and be target independent. Hints or alerts regarding suggested changes to the model to optimize power consumption may be presented to a user. A revised model incorporating the suggested changes may be constructed. The one or more transmutations resulting in a lowest total power score may be selected for hardware generation.

27 Claims, 17 Drawing Sheets

(56) References Cited

U.S. PATENT DOCUMENTS

| | | | |
|---|---|---|---|
| 6,216,252 B1 | 4/2001 | Dangelo et al. | |
| 6,282,699 B1 | 8/2001 | Zhang et al. | |
| 6,437,805 B1 | 8/2002 | Sojoodi et al. | |
| 6,505,339 B1 | 1/2003 | Miller et al. | |
| 6,584,601 B1 | 6/2003 | Kodosky et al. | |
| 6,651,222 B2 | 11/2003 | Gupta et al. | |
| 6,883,147 B1 | 4/2005 | Ballagh et al. | |
| 7,103,526 B2 | 9/2006 | Allen et al. | |
| 7,143,368 B1 | 11/2006 | Plofsky et al. | |
| 7,162,710 B1 | 1/2007 | Edwards et al. | |
| 7,178,112 B1 | 2/2007 | Ciolfi et al. | |
| 7,197,743 B2 | 3/2007 | Borg et al. | |
| 7,260,501 B2 | 8/2007 | Pattloati et al. | |
| 7,275,026 B2 | 9/2007 | Mani et al. | |
| 7,313,449 B1 | 12/2007 | Ciolfi et al. | |
| 7,318,014 B1* | 1/2008 | Molson et al. | 703/13 |
| 7,331,037 B2 | 2/2008 | Dickey et al. | |
| 7,340,684 B2 | 3/2008 | Ramamoorthy et al. | |
| 7,366,997 B1* | 4/2008 | Rahmat et al. | 716/111 |
| 7,376,544 B1 | 5/2008 | Dick et al. | |
| 7,509,244 B1 | 3/2009 | Shakeri et al. | |
| 7,725,848 B2* | 5/2010 | Nebel et al. | 716/136 |
| 7,788,625 B1* | 8/2010 | Donlin et al. | 716/109 |
| 7,882,457 B1 | 2/2011 | Plofsky et al. | |
| 7,882,462 B2 | 2/2011 | Ogilvie et al. | |
| 7,900,188 B2 | 3/2011 | Costa et al. | |
| 7,983,879 B1 | 7/2011 | Vetsch et al. | |
| 8,046,386 B2 | 10/2011 | Taitel | |
| 8,082,530 B1* | 12/2011 | Ou et al. | 716/109 |
| 8,286,112 B2* | 10/2012 | Miranda et al. | 716/110 |
| 8,589,870 B2* | 11/2013 | Ogilvie | G06F 8/34 717/106 |
| 8,694,947 B1 | 4/2014 | Venkataramani et al. | |
| 8,898,049 B2* | 11/2014 | Dhanwada et al. | 703/13 |
| 2002/0022905 A1 | 2/2002 | Erlanoen et al. | |
| 2002/0080174 A1 | 6/2002 | Kodosky et al. | |
| 2002/0188928 A1 | 12/2002 | Szpak et al. | |
| 2002/0193078 A1 | 12/2002 | MacFarlane et al. | |
| 2003/0016234 A1 | 1/2003 | Mani et al. | |
| 2003/0215017 A1 | 11/2003 | Fang | |
| 2004/0049596 A1 | 3/2004 | Schuehler et al. | |
| 2004/0210685 A1 | 10/2004 | Orofino et al. | |
| 2004/0243964 A1 | 12/2004 | McElvain et al. | |
| 2005/0055666 A1 | 3/2005 | Kornerup et al. | |
| 2006/0064670 A1 | 3/2006 | Linebarger et al. | |
| 2006/0080076 A1* | 4/2006 | Lahiri et al. | 703/18 |
| 2006/0225021 A1 | 10/2006 | Padalia et al. | |
| 2007/0058572 A1 | 3/2007 | Clauberg | |
| 2007/0113209 A1 | 5/2007 | Park et al. | |
| 2007/0261040 A1 | 11/2007 | Ogilvie et al. | |
| 2007/0277161 A1 | 11/2007 | Herbordt et al. | |
| 2008/0098349 A1 | 4/2008 | Lin et al. | |
| 2008/0189089 A1 | 8/2008 | Lee | |
| 2008/0234995 A1 | 9/2008 | Newcomb et al. | |
| 2009/0002371 A1 | 1/2009 | Linebarger et al. | |
| 2011/0035203 A1* | 2/2011 | Dalton et al. | 703/14 |

OTHER PUBLICATIONS

Khouri, K.S.; Lakshminarayana, G.; Jha, N.K. "High-level synthesis of low-power control-flow intensive circuits ", Dec. 1999, IEEE Transactions on CAD of Integrated Circuits and Systems, vol. 18, Issue: 12, pp. 1715-1729.*

Benini et al., Regression models for behavioral power estimation, Apr. 1998, Integrated Computer-Aided Eng., vol. 5, No. 2, pp. 95-106.*

Nebel, "System-level power optimization", Digital System Design, 2004. DSD 2004. Euromicro Symposium on, on pp. 27-34.*

Khouri et al., IMPACT: A high-level synthesis system for low power control-flow intensive circuits, Feb. 23-26, 1998, Proceedings Design, Automation and Test in Europe, pp. 848-854.*

Lakshminarayana G.; Raghunathan, A.; Khouri, K.S.; Jha, N.K.; Dey, S. "Common-case computation: a high-level energy and performance optimization technique", Jan. 2004, IEEE Transactions on CAD of Integrated Circuits and Systems, vol. 23, Issue: 1, pp. 33-49.*

Dasgupta, Aurobindo, et al., "Simultaneous Scheduling Binding for Power Minimization During Microarchitecture Synthesis," Department of Electrical and Computer Engineering, University of Massachusetts-Amherst, Jan. 1995, pp. 1-6.

Chen, Deming, et al., "High-Level Power Estimation and Low-Power Design Space Exploration for FPGAs," IEEE, Jan. 2007, pp. 529-534.

Raudvere, Tarvo, et al., Application and Verification of Local Nonsemantic-Preserving Transformations in System Design,' IEEE, vol. 27, No. 6, Jun. 2008, pp. 1091-1103.

Macii, Enrico, et al., "High-Level Power Modeling, Estimation, and Optimization," IEEE, vol. 17, No. 11, Nov. 1998, pp. 1061-1079.

Ahuja, Sumit, "High Level Power Estimation and Reduction Techniques for Power Aware Hardware Design," Virginia Polytechnic Institute and State University, Blacksburg, Virginia, May 12, 2010, pp. ii-43.

Acosta, Alfonso, "ForSyDe: Rising the Abstraction Level in System Design," Royal Institute of Technology, Stockholm, Sweden, Mar. 27, 2008, pp. 1-98.

"Actel Digital Signal Processing (DSP) Solution," Actel Corporation, <http://web.archive.org/web/20071028055746/www.actel.com/products/solutions/dsp/default.aspx>, Oct. 11, 2007, pp. 1-5.

Akella, Sreesa, "Guidelines for Design Synthesis Using Synopsys Design Compiler," Department of Computer Science Engineering University of South Carolina, Columbia, South Carolina, Dec. 2000, pp. 1-13.

Allen, Eric et al., "Interactive Object-Oriented Simulation of Interconnected Power Systems Using SIMULINK," IEEE Transactions Education, vol. 44(1):87-95, Feb. 2001.

Banerjee, Prithviraj et al., "Overview of a Compiler for Synthesizing MATLAB Programs onto FPGAs," IEEE Transactions on Very Large Scale Integration (VLSI) Systems, vol. 12(3):312-324, Mar. 2004.

Bell, et al. "Integration of Hardware into the Labview Environment for Rapid Prototyping and the Development of Control Design Applications", Sep. 8, 2004, IEEE, pp. 79-81.

Bjureus, Per et al., "FPGA Resource and Timing Estimation from Matlab Execution Traces," International Conference on Hardware Software Codesign, Proceedings of the tenth international symposium on Hardware/software codesiqn, pp. 31-36, May 2002.

Cordy, James R. et al, "GVL: A Graphical, Functional Language for the Specification of Output in Programming Languages," IEEE International Conference on Systems, Man and Cybernetics, pp. 11-22, Mar. 1990.

English Translation of EP1387260 publication dated Feb. 4, 2004, pp. 1-14.

Goering, Richard, "MathWorks Moving Deeper into IC Design," Sep. 18, 2006, pp. 1-3.

Golin, Eric J., et al., "A Visual Design Environment," Proceedings of the 1993 IEEE/ACM international conference on Computer-aided design, Santa Clara, CA, pp. 364-367, Nov. 1993.

Haldar, Malay et al., "FPGA Hardware Synthesis from MATLAB," Fourteenth International Conference on VLSI Design, pp. 299-304 (Jan. 2001).

Hunt, Neil, "IDF: A graphical data flow programming language for image processing and computer vision," IEEE International Conference on Systems, Man and Cybernetics, pp. 351-360, Nov. 1990.

International Preliminary Report on Patentability for Application No. PCT/US2005/033846, dated Nov. 3, 2006.

International Search Report for Application No. PCT/US2006/036420, dated Jul. 2, 2007.

International Search Report for Application No. PCT/US2007/019734, dated Nov. 11, 2008.

Leping, et al. "A Simulated Training System of Power Based on Interaction between C# Programs and Simulink", Mar. 2011, IEEE, p. 1-4.

Licko, Miroslav, et al., "MATLAB/Simulink Based Methodology for Rapid-FPGA-Prototyping," P.Y.K. Cheung et al., (Eds.), Lecture Notes on Computer Science, Field-Programmable Logic and Applications, Springer-Verlag, pas. 984-987, Jan. 2003.

(56) References Cited

OTHER PUBLICATIONS

Martins, Sergio et al., "A high-level tool for the design of custom image processing systems," Proceedings of the 2005 8th Euromicro conference on Digital System Design (OSO'05), pp. 346-349 (Sep. 2005).

"MathWorks™ Products for Signal Processing and Communications," The MathWorks, Inc., Mar. 2008, pp. 1-4.

MathWorks, "Stateflow and Stateflow coder, For Complex Logic and State Diagram Modeling, User's Guide, Version 5" The MathWorks, Inc., Jul. 2002.

National Instruments, "LabVIEW User Manual", Apr. 2003, 349 pages.

Nayak, Anshuman et al., "Accurate Area and Delay Estimators for FPGAs," Proceedings of the 2002 Design, Automation and Test in Europe Conference and Exhibition (DATE'02), pp. 862-869, Mar. 2002.

Ou, Jingzhao et al., "PyGen: A MATLAB/Simulink Based Tool for Synthesizing Parameterized and Energy Efficient Designs Using FPGAs," Proceedings of the 12th Annual IEEE Symposium on Field-Programmable Custom Computing Machines, pp. 47-56 (Apr. 2004).

"Precision RTL Synthesis User's Manual," 2003c Update 1, Mentor Graphics Corporation, Mar. 2004, pp. 1-119.

Pohl, Zdenek et al., "Logarithmic Arithmetic for Real Data Types and Support for Matlab/Sirnulink Based Rapid-FPGA-Prototyping," International Parallel and Distributed Processing Symposium, Apr. 2003.

Popinchalk, Seth, "Building Accurate, Realistic Simulink Models," Newsletters, The MathWorks, Inc., Nov. 2006, pp. 1-10.

Popinchalk, Seth, "Improving Simulation Performance in Simulink," The MathWorks, Inc., <http://www.eetimes.com/General/PrintView/4087424>, Apr. 2012, pp. 1-10.

Portero, Antoni et al., "Study of High Level design methodologies for a MPEG frames I Compressor for a HW/SW Implementation," 2004 IEEE International Conference on Industrial Technology (ICIT), DOS. 1688-1693 (Dec. 2004).

radiolab 3G, "The Easier Way to 3G Design Success" RadioScape Ltd. (2003).

radioscape, "Simulation Drive Testing in Wireless Communications Systems," RadioScape Ltd. (2003).

Raudvere, Tarvo, et al., "Application and Verification of Local Nonsemantic-Preserving Transformations in System Design," IEEE Transactions on Computer-Aided Design of Integrated Circuits and Systems, vol. 27, No. 6, Jun. 2008, pp. 1-13.

Sander, Ingo, "System Modeling and Design Refinement in ForSyDe," Royal Institute of Technology, Stockholm, Sweden, Apr. 2003, pp. 1-244.

SIGNALogic®, "Real-Time Composer™ Visual Environment," retrieved online at http://www.siQnalogic.com/index.pl?page=vis_dsp (2004).

SIGNALogic®, "DSPower® Real-Time Code Generator," retrieved online at http://www.signalogic.com/index.pl?page=rtcg (2004).

Simulink® 7: User's Guide, The MathWorks, Inc., Sep. 2009, pp. 1-1528.

Simulink® HDL Coder™ 1: User's Guide, The MathWorks, Inc., Mar. 2008, pp. 1-552.

The MathWorks, Simulink Model-Based and System-Based Design, Using Simulink, Version 4, The MathWorks, Inc., Jun. 2001.

The MathWorks, Simulink, Model-Based and System-Based Design, Using Simulink, Version 5, The MathWorks, Inc., Jul. 2002.

The MathWorks, "Simulink, Simulation and Model-Based Design, Writing S-Functions. Version 6," The MathWorks, Inc., Mar. 2005.

U.S. Appl. No. 12/963,433, filed Dec. 8, 2010 by Girish Venkataramani, et al. for a Hardware Definition Language Generation for Data Serialization from Executable Graphical Models, all pages.

Vogel. Thomas. "Simulink, sfunctlon with variable sized outputport possible?" retrieved online at: http://www.mathworks.com/matlabcentral/newsreader/view_thread/52973, Aug. 2003.

Woodward, Mike, "Getting Graphical in 3G Wireless Designs," CommsDesign, The MathWorks, Mar. 2003.

Woodward, Mike, "RadioLab 3G—a toolbox for 3G applications," pp. 1-5, 2001.

Woodward, Michael, "Getting graphical in wireless 3G designs," International Signal Processing Conference (2003).

"Working With Xilinx® Devices and Place and Route Tools," Altium, AP0112 (v1.0), Jan. 13, 2004, pp. 1-6.

Written Opinion for Application No. PCT/US2Q06/036420, dated Jul. 2, 2007.

Zacher, Darren, "How to Use Register Retiming to Optimize Your FPGA Designs," Mentor Graphics, <http://www.eetimes.com/design/programmable-logic/4014801/How-to-use-register-retiming-to-optimize-your-FPGA-designs>, EE Times Group a UBM company, Dec. 14, 2005, pp. 1-5.

\* cited by examiner

MODEL LEVEL POWER CONSUMPTION OPTIMIZATION IN HARDWARE DESCRIPTION GENERATION

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
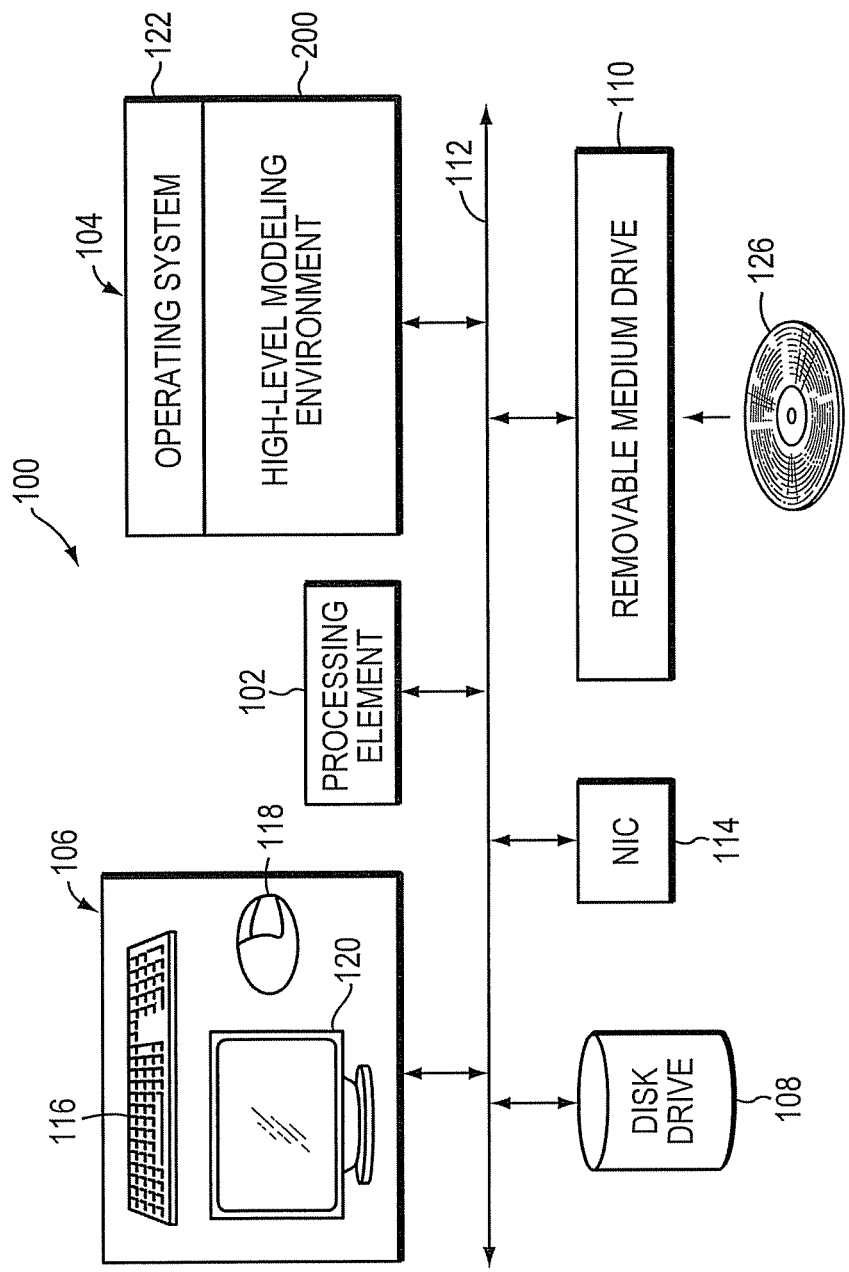
FIG. 1 is a schematic block diagram of a data processing system suitable for use with the present invention.

The need to manage power consumption by devices, including embedded systems, such as mobile phones, laptop computers, electronic control units, etc., is becoming an increasingly important aspect of the design of such systems. The power consumed by hardware devices, such as Programmable Logic Devices (PLDs), Field Programmable Gate Arrays (FPGAs), and Application Specific Integrated Circuits (ASICs), comes from two sources: static power and dynamic power. Static power consumption is caused by transistor leakage current whether the hardware device is running or idle. Dynamic power consumption refers to the power consumed when a signal transition occurs at gate outputs.

Some power consumption analyzers operate at the Register Transfer Level (RTL), which is typically produced when the design is synthesized from a hardware description, such as Verilog or very high speed integrated circuit hardware description language (VHDL) to the gate-level. The analyzers are also tightly coupled to the specific target hardware. A need exists for determining power consumption at a level higher than RTL.

Overview

Exemplary embodiments can be used for computing power information for a model, such as a high-level model, to be implemented in target hardware, and for performing one or more transmutations on the model in an effort to reduce the model's power consumption. For example, one or more components may be moved from a fast rate model portion or region to a slow rate portion or region, the bit width of data or other signals or values may be reduced, multiple instances of a resource may be reduced in favor of a shared resource, etc. The computed power information may be independent of any particular target hardware. The high-level model may be a text-based model, an executable graphical model, or a graphical model having executable semantics, and may include one or more subsystems having one or more components that perform functions on data, such as signals or state information. The system may include a compiler, a power score evaluation engine, a power score database, a power optimization engine, a high-level model builder, a hardware description language generator, and an interface. The compiler may generate one or more intermediate representations (IRs) of the high-level model. In particular, the compiler may translate the model among a series of levels to reach a low-level IR that is made up entirely of core components. A core component represents an elementary or base level operation, such as Add, Multiply, Delay, AND, OR, Compare, Switch, etc. That is, while the high-level model may be defined by a plurality of high-level operations or blocks, such as a filter operation or block, each high-level operation or block may be lowered to a plurality of core components. Typically, a given high-level operation or block will be made up of a plurality of core components.

The power score evaluation engine may analyze the low-level IR and assign a power score value to each core component. The power score evaluation engine may retrieve the power score values from the power score database. The power score database may contain one or more tables, such as Lookup Tables (LUTs) that can contain a set of pre-computed power scores. A particular LUT utilized by the power score evaluation engine may be user-selected or may be selected programmatically. In an embodiment, instead of being power consumption values, the pre-computed power scores are non-dimensional scores that represent power consumption relationships among some or all of the core components. For example, an Adder may have a power score of 1, and a Multiplier may have a power score of 4. The power score evaluation engine may apply one or more adjustments to the power scores to produce adjusted power scores. For example, the evaluation engine may adjust the power scores based on the bit width of the data being processed by the core components, and may also adjust the power scores based on the rate at which the respective core components operate. Bit width and rate information may be included in the low-level IR by the compiler. After assigning and adjusting the power scores for the core components, the power score evaluation engine may sum the adjusted power scores to produce a total, aggregate power score for the entire model. This power score may be presented to the user.

The power optimization engine may include one or more transmutation tools. Each transmutation tool may perform a particular modification to the IR to decrease and/or reduce power consumption. Each transmutation tool may preserve the results being computed by the original high-level model. For example, a first tool may examine the IR, and identify regions of the IR operating at different rates. The power score evaluation engine may analyze the IR to produce a total power score. The first tool may modify the IR by moving one or more core components from a faster rate region to a slower rate region. Following the modification of the IR by the first tool, the power score evaluation engine may analyze the modified IR to produce a new total power score. This new power score may be compared to the original power score to determine whether the modifications result in a decrease in power consumption.

A second tool may evaluate the IR, and determine whether one or more modifications may be made in order to reduce the bit width of data processed by one or more core components. A third tool may evaluate the IR, and determine whether multiple instances of a core component, such as an Adder, may be replaced with a single instance of the core component. Again, after the second or third tool performs its modifications, the power score evaluation engine may generate a new power score for the modified version of the IR.

In an embodiment, the IR version resulting in the lowest total power score may be selected for hardware generation. That is, the optimization engine may evaluate the different total power scores, and select the modified IR resulting in the lowest total power score. The selected IR may be passed to the model builder and to the hardware description generator. The model builder may create a new high-level model based on the selected IR, which has been modified relative to the original IR. This new high-level model may be presented to the user so that the changes may be evaluated by the user. A hardware description language generator may generate hardware description language (HDL) code from the selected IR. This HDL code may be passed to one or more synthesis tools for implementing the HDL code in selected target hardware.

FIG. 1 is a schematic illustration of a computer or data processing system 100 for implementing and utilizing an embodiment of the invention. The computer system 100 includes one or more processing elements, such as a processing element 102, a main memory 104, user input/output (I/O) 106, a data storage unit, such as a disk drive 108, and a removable medium drive 110 that are interconnected by a system bus 112. The computer system 100 may also include a communication unit, such as a network interface card (NIC) 114. The user I/O 106 may include a keyboard 116, a pointing device, such as a mouse 118, and a display 120. Exemplary processing elements include single or multi-core Central Processing Units (CPUs), Graphics Processing Units (GPUs), Field Programmable Gate Arrays (FPGAs), Application Specific Integrated Circuits (ASICs), etc. Other pointing devices include touchpads and touchscreens, among others.

The main memory 104 may store a plurality of libraries or modules, such as an operating system 122, and one or more applications running on top of the operating system 122, including a high-level modeling environment 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers and other portable computing devices, etc. Nonetheless, those skilled in the art will understand that the computer system 100 of FIG. 1 is intended for illustrative purposes only, and that the present invention may be used with other computer systems, data processing systems, or computational devices. The present invention may also be used in a networked, e.g., client-server, computer architecture, or a public and/or private cloud computing arrangement.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating systems, among others.

As indicated above, a user or developer, such as an engineer, scientist, programmer, etc., may utilize the keyboard 116, the mouse 118, and the display 120 to operate the high-level modeling environment 200, and construct one or more models of a system that is being designed. The models may be computational and may have executable semantics. The models may be executable. The execution of a model may simulate the system that is being designed.

In an embodiment, suitable high-level modeling environments include the MATLAB® and SIMULINK® technical computing environments from The MathWorks, Inc. of Natick, Mass., the Stateflow charting tool from The MathWorks, Inc., the LabVIEW programming system from National Instruments Corp. of Austin, Tex., the Visual Engineering Environment (VEE) from Agilent Technologies, Inc. of Santa Clara, Calif., the System Studio model-based signal processing algorithm design and analysis tool from Synopsys, Inc. of Mountain View, Calif., the SPW signal processing algorithm tool from Synopsis, a Unified Modeling Language (UML) system, a Systems Modeling Language (SysML) system, and the System Generator System from Xilinx, Inc. of San Jose, Calif., among others. The high-level modeling environment may contain less implementation detail and thus operate at a higher level than certain programming languages, such as the C, C++, C#, and SystemC programming languages.

Those skilled in the art will understand that the MATLAB® technical computing environment is a math-oriented, textual programming environment for digital signal processing (DSP) design, among other uses. The SIMULINK® technical computing environment is a graphical, block-based environment for modeling and simulating dynamic systems, among other uses.

In another embodiment, a programming language, such as the C, C++, C#, and SystemC programming languages, among others, may be used to create the model instead of a high-level modeling environment.

Figure 2:
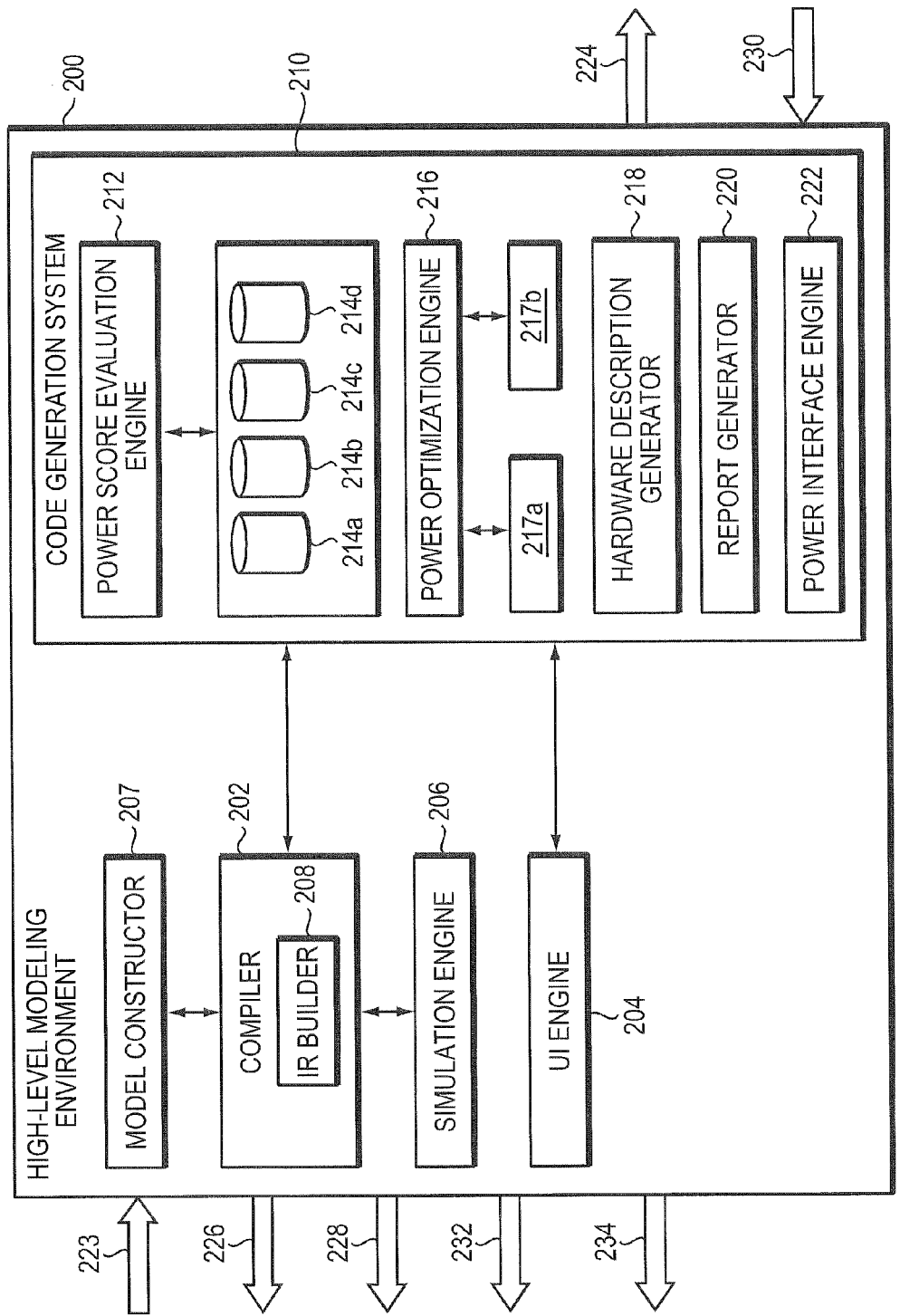
FIG. 2 is a partial schematic block diagram of a high-level modeling environment.

FIG. 2 is a partial block diagram of an embodiment of the high-level modeling environment 200. The environment 200 may include a compiler 202, a user interface (UI) engine 204, a simulation engine 206, and a model constructor 207. The compiler 202 may include one or more Intermediate Representation (IR) builders, such as IR builder 208.

In an embodiment, a system 210, such as a code generation system, is integrated with the high-level modeling environment 200. For example, the code generation system 210 may be implemented as an add-on tool to the environment 200, or it may be built-into the environment 200, among other options. Alternatively, the code generation system 210 may be separate from the high-level modeling environment 200, but in a communicating relationship with it. The code generation system 210 may include a plurality of components or modules. In particular, the system 210 may include a power score evaluation engine 212, one or more power score databases or data structures, such as databases 214a-d, a power optimization engine 216, one or more optimization modules, such as optimization modules 217a, 217b, a hardware description generator 218, a report generator 220, and a power interface engine 222.

In an implementation, high-level modeling environment 200 may receive inputs by a user as the user creates, edits, revises, and/or opens one or more models, as indicated by arrow 223. The model created by the user may be a Simulink model, a Stateflow chart, a LabVIEW block diagram, a VEE diagram, a MATLAB file, etc. The model may represent a dynamic system, such as an aircraft flight controller, an engine control unit (ECU), an embedded system, etc. The simulation engine 206 simulates the modeled system, e.g., it executes the model. That is, icons or blocks of the model may represent computations, functions, operations, or states, and interconnecting lines or arrows among those blocks may represent data, signals, events, or mathematical relationships among those computations, functions, operations, or states. The icons or blocks may be selected by the user from one or more libraries or palettes that contain icons for the blocks supported by the high-level modeling environment 200.

The UI engine 204 may provide or support a graphical user interface (GUI) having a Run button that may be selected by the user. The UI engine 204 may also provide or support a Command Line Interface (CLI) that may receive a run command entered by the user. In response to the user selecting the Run button or entering the run command, the simulation engine 206 may execute or run the model, and may present the results generated by the model's execution to the user via the display 120.

The UI engine 204 may also provide or support a Code Generation button or option that may be selected by the user, or the UI engine 204 may receive a code generation command entered by the user, e.g., in the GUI or the CLI. In response to the user selecting the Code Generation button or entering the code generation command, the hardware description generator 218 may generate code for at least part of the model, and may store the results of the code generation operation in memory. For example, the hardware description generator 218 may produce hardware description code corresponding to the model created by the user, as indicated by arrow 224. Exemplary hardware descriptions that may be generated include hardware description language (HDL) code, such as VHDL, Verilog, SystemC, embedded MATLAB, and vendor or target specific HDL code, such as Xilinx FPGA libraries, etc.

The power score evaluation engine 212 may derive and present power consumption information to the user. For example, the evaluation engine 212 may automatically compute power consumption information as the user creates or edits the model and may present this information to the user, for example, via the display 120. The power optimization engine 216 may evaluate the model again as it is constructed and revised by the user, and identify potential changes that, if made, may reduce the power consumption of the model when implemented in target hardware, such as an FPGA. These suggested changes may be presented to the user, as indicated by arrow 226. In an embodiment, the suggested changes may be represented through a modified model created by the model constructor 207, and presented to the user for evaluation, for example, on the display 120, as indicated by arrow 228.

Power information from other modules either within or outside of the high-level modeling environment 200 may be received by the power interface engine 222, as indicated by arrow 230. The report generator 220 may produce one or more reports of the power requirements of the model under construction, as well as other information, such as the area requirements of the model, and may present the report to the user, as indicated by arrow 232.

In an embodiment, suitable hardware description generators for use with the present invention include the system disclosed in U.S. Patent Publication No. 2009/0002371 for Generation of Code from a Graphical Model, and the Simulink HDL Coder product from The MathWorks, Inc. Those skilled in the art will understand that other code generation systems may be used.

The code generation system 200 may include or access a validation engine (not shown). The validation engine may receive source and validation models, and produce validation results, as indicated by arrow 234. A suitable validation engine is disclosed in commonly owned, co-pending U.S. patent application Ser. No. 12/963,371, filed Dec. 8, 2010 for a Resource Sharing Workflows within Executable Graphical Models, which is hereby incorporated by reference in its entirety.

The high-level modeling environment 200 may further include one or more debugging facilities (not shown) that may, for example, allow halting a simulation or execution at one or more breakpoints. A breakpoint may be specified for a variable, for example, to halt simulation or execution when the variable value changes. A breakpoint also may be conditional, for example, only halting simulation or execution when a variable value changes and the current time of simulation or execution is in a certain time interval, or only halting simulation or execution when a variable has changed a specified number of times.

The power score evaluation engine 212, power optimization engine 216, optimization modules 217, hardware description generator 218, report generator 220, and power interface engine 222 may each comprise registers and combinational logic configured and arranged to produce sequential logic circuits. In an embodiment, the power score evaluation engine 212, power optimization engine 216, optimization modules 217, hardware description generator 218, report generator 220, and power interface engine 222 may be implemented through one or more software modules or libraries containing program instructions pertaining to the methods described herein. The software modules may be stored on main memory 104 and/or computer readable media, such as computer readable medium 126, and executable by one or more processing elements, such as processing element 102. Other computer readable media may also be used to store and execute these program instructions. In alternative embodiments, various combinations of software and hardware, including firmware, may be utilized to implement the present invention.

The power score databases 214a-d may be implemented through Look-Up Tables (LUTs), hash tables, decision trees, or other data structures.

Figure 3A:
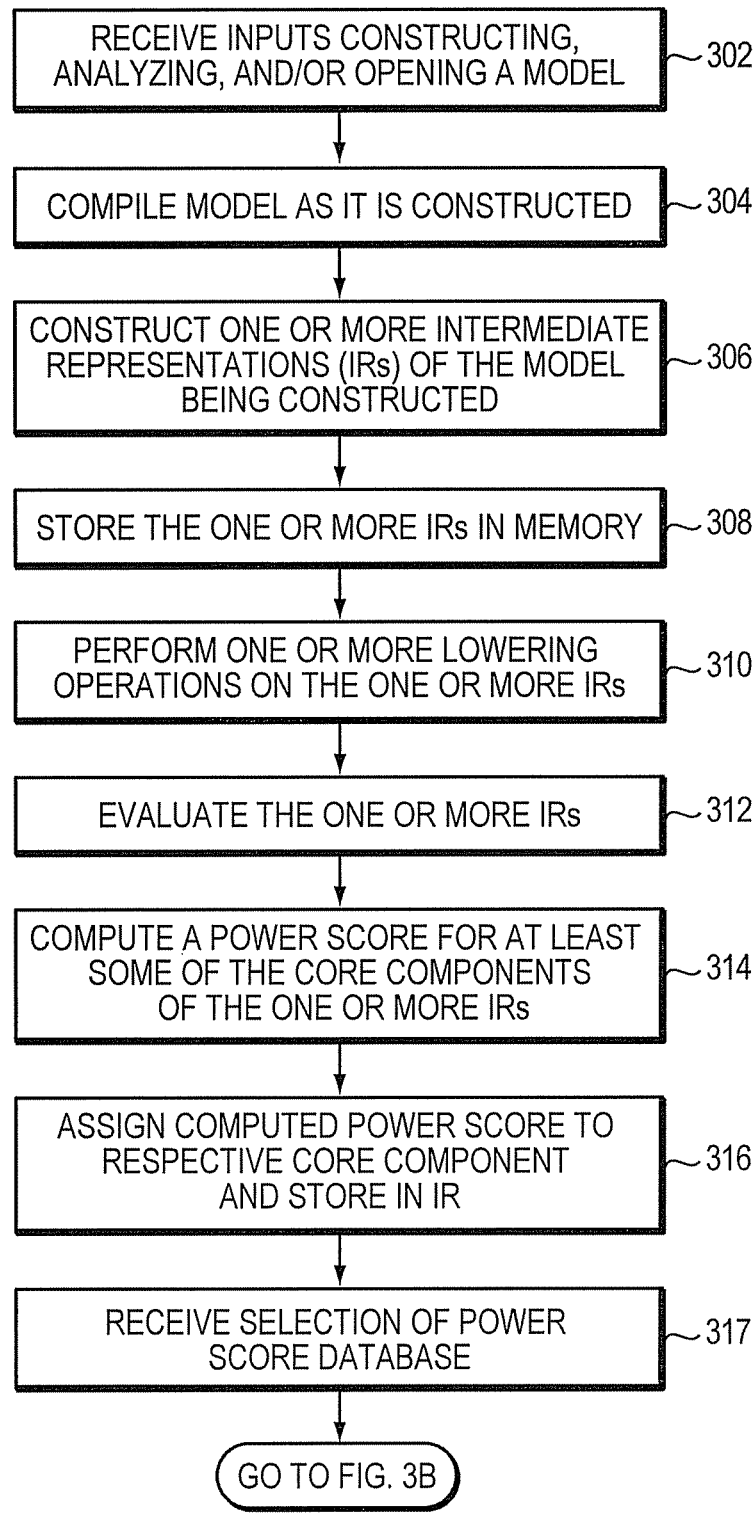
FIGS. 3A-C is a flow diagram of a method in accordance with an embodiment of the present invention.
Figure 3B:
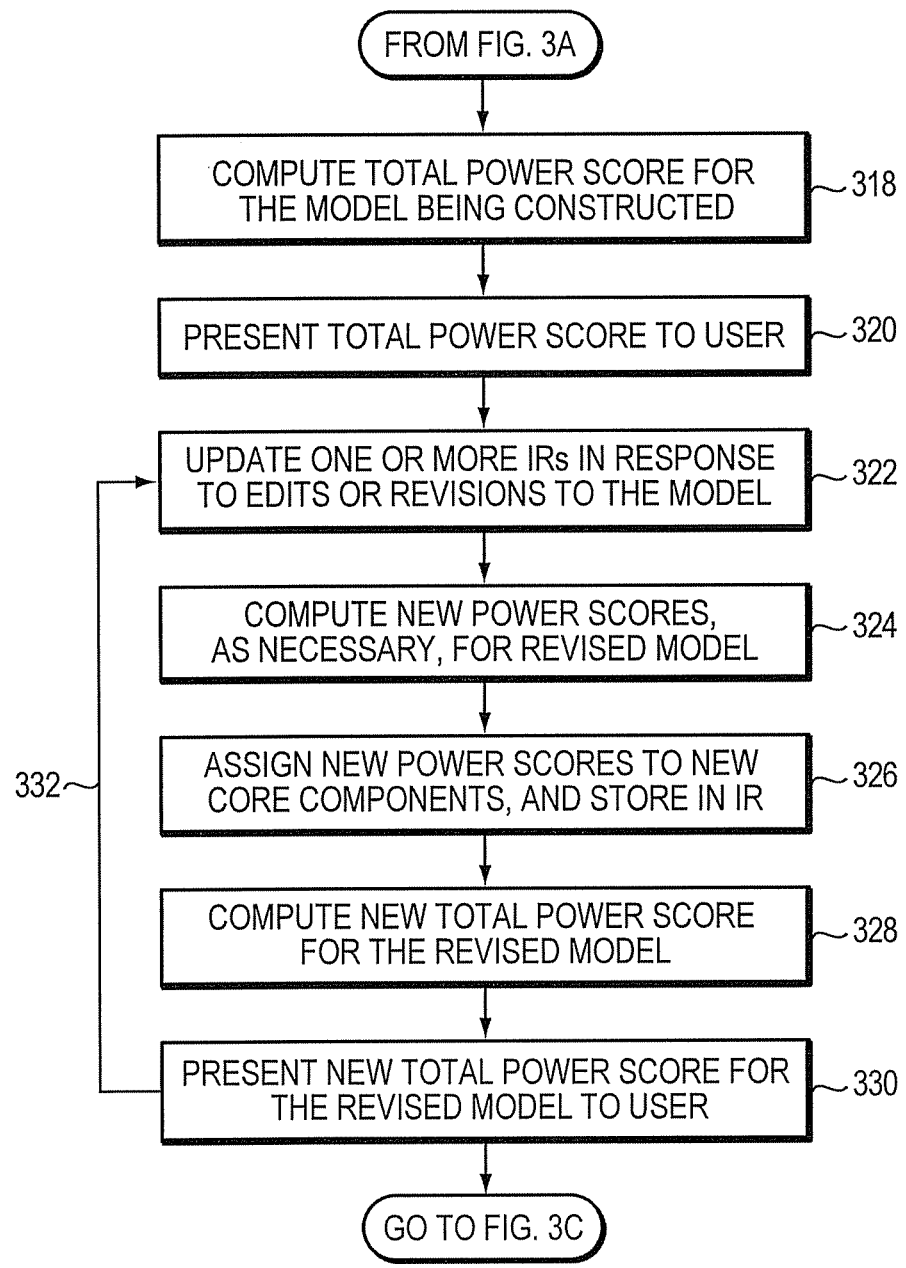
Figure 3C:
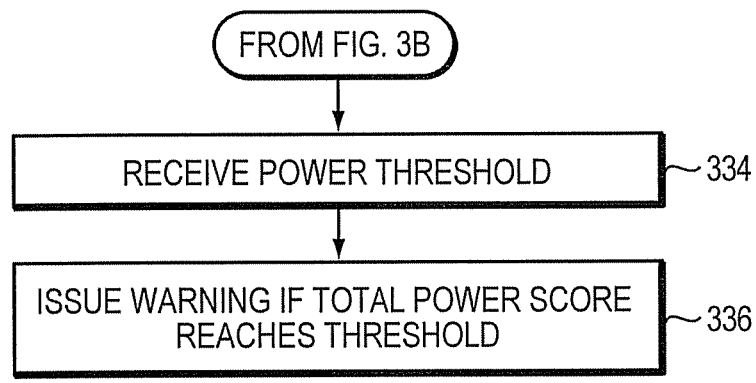

FIGS. 3A-C is a flow diagram of a method in accordance with an embodiment of the invention. The high-level modeling environment 200 may receive inputs from a user constructing, analyzing, or opening a model, as indicated at block 302. Environment 200 may support the creation of graphical, text-based, or a combination of graphical and text-based models. The user may operate and interact with environment 200 through the user I/O 106, such as the keyboard 116, mouse 118, and display 120. For example, the UI engine 204 may present a model editor on the display 120. The model editor may include a menu bar, a tool bar, a canvas, and one or more palettes of available blocks. The user may select one or more blocks from one or more palettes, and place them on the canvas. The user may then connect the blocks, e.g., with lines such as arrows, thereby establishing mathematical or other relationships among the blocks on the canvas. Exemplary blocks include Filter blocks, Transformation blocks, such as Fast Fourier Transform (FFT) and Discrete Cosine Transform (DCT) blocks, Correlation blocks, code blocks, such as the Embedded MATLAB block from The MathWorks, Inc., etc. In response to the user inputs, the model constructor 207 may build a model that may be presented to the user, for example, on the display 120.

Figure 4:
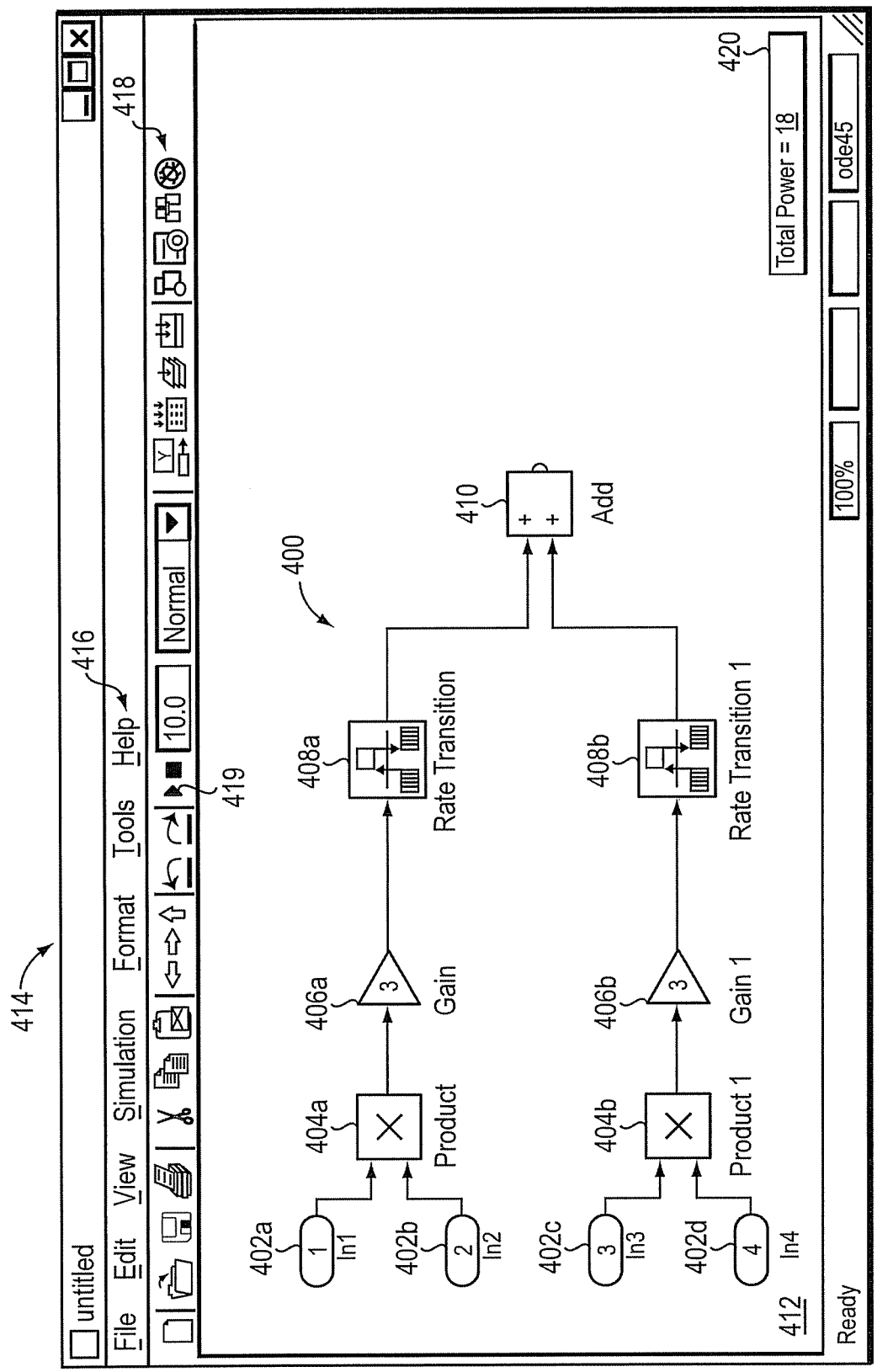
FIG. 4 is an illustration of an exemplary graphical model.

FIG. 4 is a schematic illustration of an executable, graphical model 400 under construction at a first point in time. The graphical model 400 includes a plurality blocks interconnected by lines having arrows. In particular, the model 400 includes four Inport blocks 402a-d, two Product blocks 404a-b, two Gain blocks 406a-b, two Rate Transition blocks 408a-b, and an Add block 410. The relationship represented by the arrows may depend on the kind or type of model. For example, in a time-based modeling system, an arrow may represent a mathematical relationship between two connected blocks where a first, e.g., upstream, block writes the signal, and a second, e.g., downstream, block reads the signal. In other modeling environments, the arrows or lines may represent data flow, control flow, events, mechanical relationships, etc.

The model 400 may be constructed on a model canvas 412 of a model editor 414. The model editor 414 may further include a menu bar 416 and a toolbar 418. The toolbar 418 may include a Run button 419, among other command buttons. In response to a user selecting the Run button 419, for example with the mouse 118, the simulation engine 206 may execute the model 400.

Figure 5:
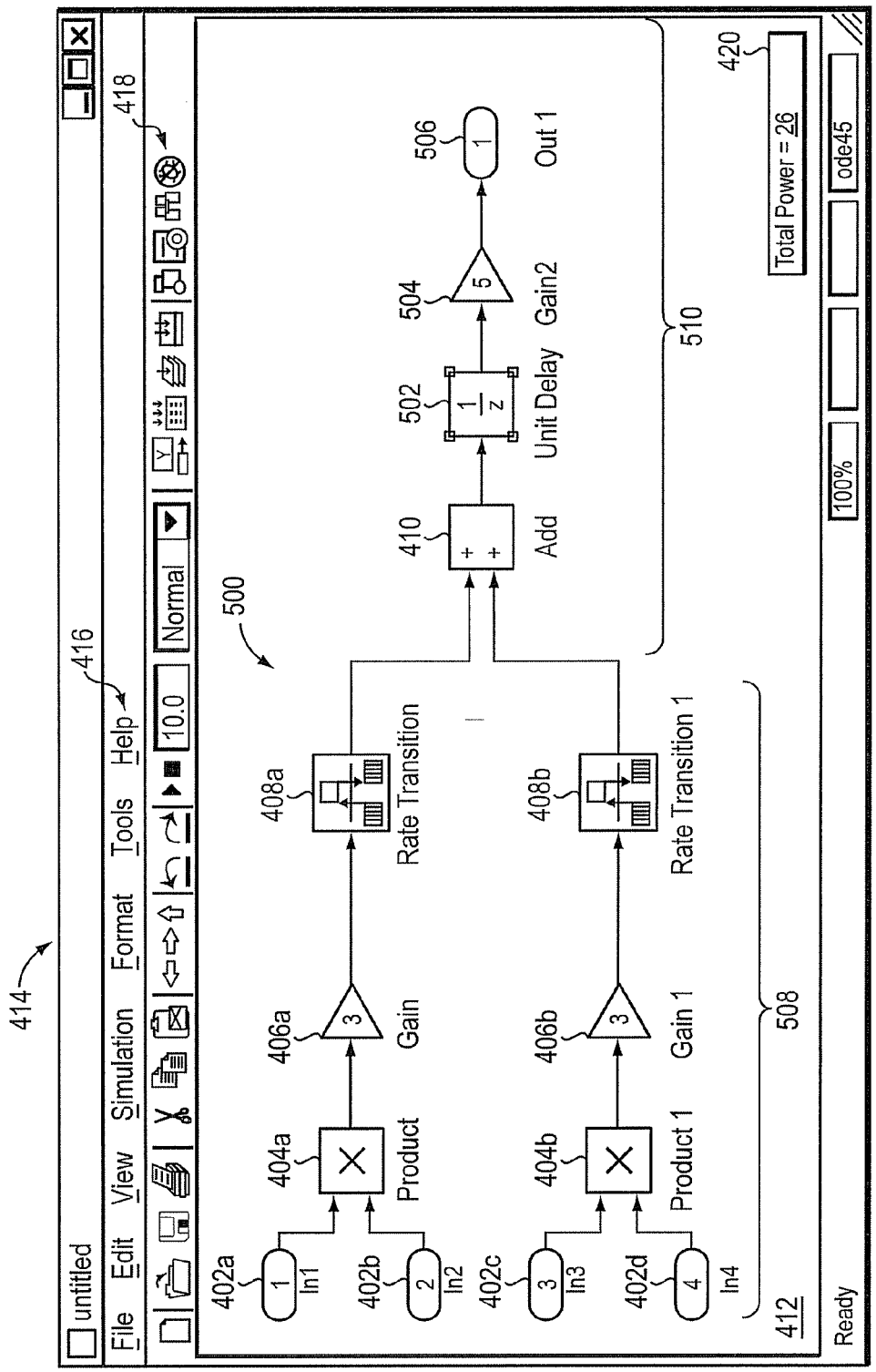
FIG. 5 is an illustration of an exemplary graphical model.

FIG. 5 is a schematic illustration of a model 500, which represents the model 400 at a second point in time, which may be later than the first point in time. In addition to blocks 402-410, the model 500 as illustrated in FIG. 5 has been further constructed or revised by the user to include a Unit Delay block 502, a third Gain block 504, and an Outport block 506. A graphical model in accordance with an embodiment may include portions that operate at different rates. For example, with reference to the model 500, a first portion 508 may operate at a first sample rate, while a second portion 510 may operate at a second sample rate that is faster than the first rate. When the design represented by the model 500 is implemented in hardware, the portion of the hardware that corresponds to the first portion 508 of the model 500 may operate at a first operating frequency, while the second portion 510 of the model 500 may operate at a second operating frequency that is higher than the first operating frequency.

As the user constructs and/or edits the model 400, 500, it may be compiled by the compiler 202, as indicated at block 304. Specifically, the IR builder 218 may construct one or more in-memory representations, also referred to as intermediate representations (IRs), of the executable model 400, 500, as part of the compilation process, as indicated at block 306. In an embodiment, at least one of the IRs may be in the form of a hierarchical, Data Flow Graph (DFG), referred to as Parallel Intermediate Representation (PIR), which has a plurality of nodes interconnected by edges. The nodes of the PIR, also known as components, represent blocks from the executable model 400, 500, the edges of the PIR, called signals, represent the connections between the blocks of the model 400, 500. Special nodes, called network instance components (NICs), may be used to provide hierarchy in the PIR, for example, by abstractly representing subsystems of the model 400, 500. That is, each block of the model 400, 500 or subsystem may map to one or more nodes of the PIR, and each line or arrow of the model 400, 500 may map to one or more edges of the PIR.

In an embodiment, the in-memory representation may have a plurality of hierarchically arranged levels. More specifically, the PIR may be a top-level of the in-memory representation of the model 400, 500 and one or more of the components of the PIR may be a particular type or form of in-memory representation. For example, one or more components of the PIR may be a Control Flow Graph (CFG), Control Data Flow Graph (CDFG), program structure tree (PST), abstract syntax tree (AST), a netlist, etc. A CDFG may capture the control flow as well as the data flow of a graphical model through data dependency and control dependency edges.

The in-memory representation or IR may be stored in memory, such as main memory 104, as indicated at block 308.

If the PIR represents a model having one or more subsystems, the optimization engine 220 may locate a subsystem, e.g., a NIC within the PIR, that has been marked for hardware description generation.

Signals may be continuously defined over a period of time based on values computed at points in time during the period. For example, a signal value may be defined over an interval of time with a start time and a stop time by extrapolating the value of the signal computed at the start time. The extrapolation may be based on a zero-order hold. As another example, a signal value may be defined over an interval of time with a start time and a stop time by interpolating the value of the signal computed at the start time and the stop time. The interpolation may be based on a first-order interpolation.

Figure 6:
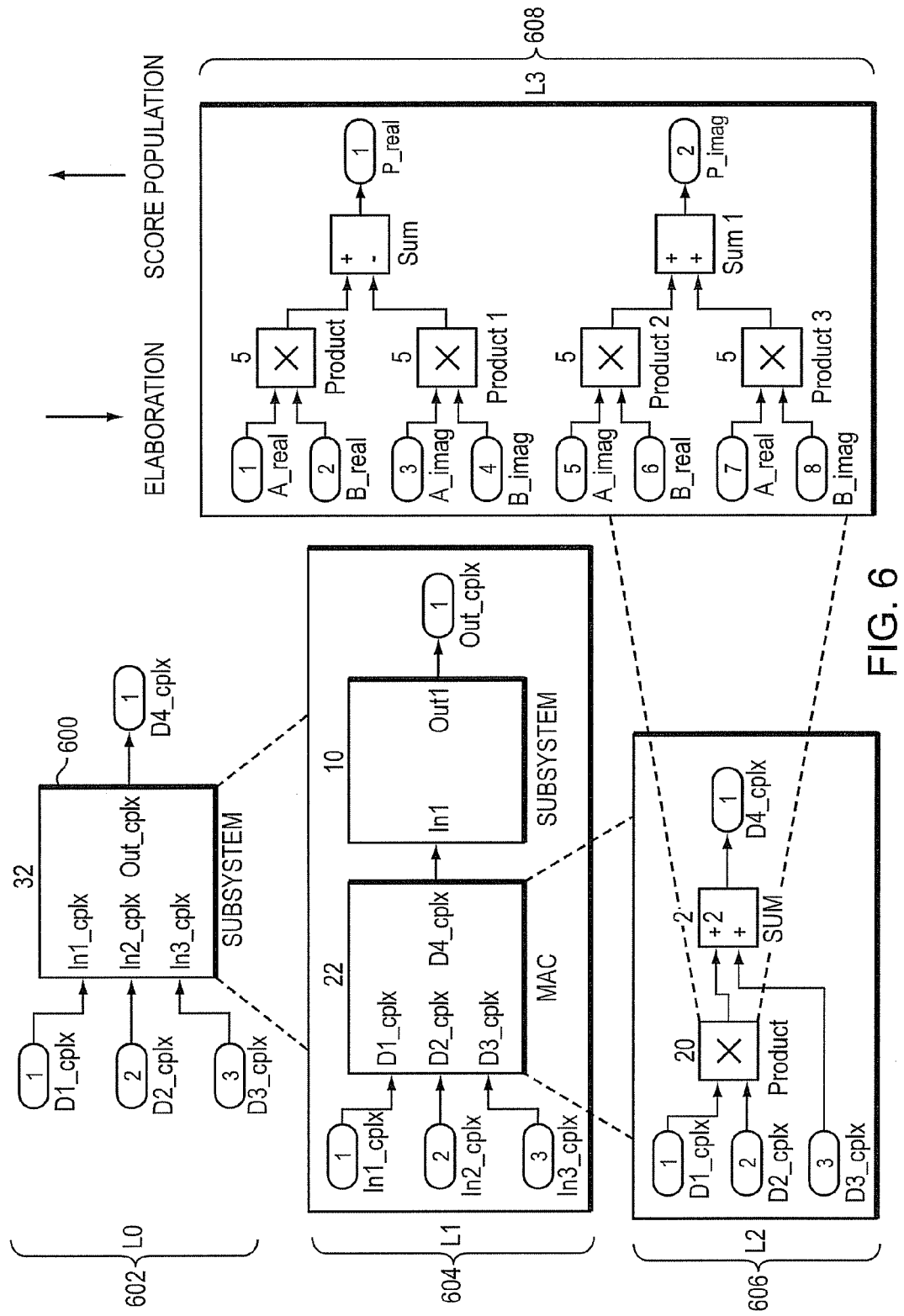
FIG. 6 is a schematic illustration of an elaboration process in accordance with an embodiment of the present invention.

In an embodiment, the IR builder 218 may perform one or more elaboration or lowering operations on the PIR by replacing nodes of higher complexity with nodes of lower complexity, as indicated at block 310. FIG. 6 is a highly schematic illustration of the elaboration or lowering operations that may be performed on a complex node of a model, such as the node for a subsystem block 600. The subsystem block 600 may be included in a first level (L0) PIR 602. In response to a first elaboration step, a second level (L1) PIR 604 may be constructed in which the subsystem block 600 is replaced with a plurality of lower level nodes, having less complexity than the node for the subsystem block 600, such as a MAC node and another subsystem node. In response to a second elaboration step, the second level (L1) PIR 604 may be reduced to a third level (L2) PIR 606 in which at least some of the nodes from the second level (L1) 604 are replaced with nodes having less complexity, such as a complex multiply (product) node that operates on data with a real and imaginary part and a sum node. In response to a third elaboration step, the third level (L2) PIR 606 may be reduced to a fourth level (L3) PIR 608 that is made up entirely of core components, such as core nodes or core blocks. The core nodes or core blocks included in the fourth level (L3) PIR 608 include product and sum blocks. A core component represents an elementary or base level operation that is not subject to further elaboration or lowering by the compiler 202. Core components also may have a one-to-one mapping with certain elementary blocks of the high-level modeling environment, such as the Simulink® modeling environment. An elementary block may refer to a block that cannot be lowered and/or is atomic in nature.

Instead of lowering a higher complexity IR, the IR builder 218 may generate an IR comprising core blocks in the first instance.

The power score evaluation engine 212 may evaluate the one or more PIRs as they are being constructed by the IR builder 208, as indicated at block 312. Specifically, the power score evaluation engine 212 may evaluate the fourth level (L3) PIR 608 that is made up of core components. The evaluation engine 212 may compute a power score for at least some, and preferably all, of the core components of the PIR 608, as indicated at block 314. To compute a given power score, the evaluation engine 212 may access at least one of the power score databases 214. Each power score database 214 may include a predefined power score for each core block, and may be implemented as a Look-Up Table (LUT) or other data structure, and may be stored in memory, such as main memory 104.

One or more power parameter values, such as C1 and C2 parameters, may be derived for a given core block from empirical studies or analysis, and/or heuristics. For example, tests may be run with different target hardware to determine a range of actual power consumed by core components. Each core component may then be assigned a power value based on this range. For example, the power value may be the, maximum, minimum, mean, or median of the empirically determined power consumption range. The set of power values for a given database, e.g., LUT, may then be normalized to the lowest power value. The normalized values may correspond to the C1 power parameters of the given database. For example, it may be determined that an Add component consumes the least power out of all of the core components, and that a Product component consumes about four times the power of the Add component. In this case, the first power parameter, C1, for the Add component may be normalized to "1", and the first power parameter, C1, for the Product component may be normalized to "4". For some core components, such as the Add and Product components, the value of C2 may be zero.

Both C1 and C2 may be derived empirically based on characterization experiments.

In an embodiment, the power parameter values may be non-dimensional and target independent, and thus the computed power scores may be non-dimensional and target independent. That is, in an embodiment the powers scores may represent relative power consumption information that is not tied to any particular target hardware device. Depending on the power score database 217 that is selected, the total power score may not equal the actual power consumed by the model when implemented in hardware. However, if a first model has a first total power score that is less than the total power score for a second model, then the actual power consumed by the first model may be less than the actual power consumed by the second model, if both models were to be implemented on the same target hardware. The total power score generated for a given high-level model, therefore, may be consistent with the actual power consumed by a programmable logic device configured with hardware description code generated for the given high-level model.

In an embodiment, power information for the model 400, 500 is determined before translating the model 400, 500 into a Register Transfer Level (RTL) format. Furthermore, target specific information may not be brought into the model 400, 500 or the IR, or otherwise used by the evaluation engine 212. As described herein, the power score assigned to a given core component may be a number that is proportional to the physical, i.e., actual, dynamic power consumption of that core component when the model is implemented in hardware. The power scores thus provide a technique for comparing the power consumption of different model designs at the model-design stage, i.e., before starting the process of implementing a model in hardware. The power scores stored in the databases 214a-d may be pre-computed, i.e., computed before the user begins construction of the model 400, 500.

It should be understood that other methods, such as probabilistic methods, may be used to derive the one or more power parameter values for the core components.

The power score evaluation engine 212 may compute a power score for the core components based on, or as a function of, the power parameters for those components, as stored in the selected database, e.g., database 214a. In an embodiment, the evaluation engine 212 may use the following formula to compute a power score for a given core component:

$$Ps=(C1 \times B+C2) \times \text{Sampling Rate}$$

where,

Ps is the power score being computed,

C1 is the first power parameter for the given core component,

B is the bitwidth at the given core component,

C2 is the second power parameter for the given core component, and

Sampling Rate is the sampling rate specified for the core component.

It should be understood that other formulae or methods may be used to compute the power scores for the core blocks, such as higher order and/or non-linear curve fitting equations.

Information regarding the bitwidth and sampling rate from the model 400, 500 may be incorporated into the PIR created by the IR builder 208, and thus available to the evaluation engine 212 when computing the power scores.

The computed power scores may be assigned to the respective core components, and stored within the PIR, as indicated at block 316.

In an embodiment, the user may select the particular power score database 217 to be used by the evaluation engine 212, as indicated at block 317. That is, multiple power score databases may be provided, and a selection of particular database may be made. A user or other entity may load one or more power score databases into the system for use by the evaluation engine 212. In an embodiment, a given power score database may be calibrated to particular target hardware. For example, a set of power scores for core components may be derived for a specific target hardware, such as the Xilinx models Virtex 6, Spartan 6, etc. Another power score database may contain power scores derived for a different target hardware, such as the Altera models Stratix V, Cyclone IV, etc. In these cases where the power scores relate to particular target hardware, the power scores may be in actual power units, e.g., milliwatts. The power consumption of the clock distribution network may be integrated in the current framework as an additional parameter, for example, by approximating the structure of the clock distribution network.

After assigning computed power scores for the core components of the PIR, the power score evaluation engine 212 may compute total power information, such as a total power score, for the model 400, 500 being constructed, as indicated at block 318 (FIG. 3B). In an embodiment, the total, aggregate power score for a given subsystem may be computed by summing all of the power scores assigned to the underlying individual core components. Every subsystem also contributes a scaling factor to its total power score, based on the rate at which it is active. The subsystem power may be expressed as follows:

$$Ps=\text{Total Aggregated Power} * \text{Active Rate}$$

$$\text{Total Aggregated Power}=\Sigma(P_S(C))$$

where C represents all underlying components in the subsystem, and the Active Rate may be less than or equal to 1.

In an embodiment, the total power information computed by the power score evaluation engine 212 may represent a portion of the dynamic power of the model when implemented in target hardware. In particular, the total power information as computed by the power score evaluation engine 212 may take into consideration the effective capacitance and the operating frequency elements of dynamic power. The total power information may ignore the interconnections element of dynamic power.

The total power score for the model 400, 500 may be presented to the user, as indicated at block 320. For example, the evaluation engine 212 may interoperate with the UI engine 218, which, in turn, may present the computed total power score on the display 120. Referring to FIG. 4, a total power score field 420 may be included in the model editor 414. The total power score as computed for the model 400 at the point in time represented by FIG. 4 may be displayed in the field 420. As the user continues to construct or revise the model 400, e.g., by adding or removing blocks and/or signal lines, the IR builder 208 may modify the IR, as indicated at block 322. Furthermore, the evaluation engine 212 may assign new power scores to newly added core components, and may remove power scores for deleted components, and revise the total power score, as indicated at block 324. New power scores may be assigned to the respective core components and stored in the IR for the revised model, as indicated at block 326. The evaluation engine 212 may update the total power score for the revised model, as indicated at block 328, and present this new total power score for the revised model to the user, as indicated at block 330. Steps 322-330 may be repeated as the user continues to update or revise the model, as indicated by arrow 332. The system 210 thus automatically provides the user with an on-going, running indication of the model's power requirements (e.g., the power scores), as the model is constructed and/or revised by the user. For example, the evaluation engine 212 may dynamically maintain a running power score for the model 400, and this running power score may be presented to the user, and updated as the user constructs and/or revises the model 400.

A power threshold, such as an upper threshold, may be specified for the model 400, 500 under construction, as indicated at block 334 (FIG. 3C). For example, the user may specify an upper power threshold, e.g., by entering a value. The power score evaluation engine 212 may store the specified threshold in memory, such as the main memory. When the total power score as currently computed by the evaluation engine 212 approaches the specified threshold, the evaluation engine 212 may provide a warning to the user through the UI engine 204, as indicated at block 336. For example, when the computed total power score reaches 75% of the specified threshold, the evaluation engine 212 may provide a first visual cue, such as adding a yellow background to the field 420. When the computed total power score reaches 90% of the specified threshold, the evaluation engine 212 may provide a second visual cue, such as adding a red background to the field 420. Those skilled in the art will understand that other visual cues, such as a flashing banner, may be used. In an embodiment, audio cues may be used instead of, or in addition to, the visual cues.

In an embodiment, the blocks available for model construction (e.g., in a library or palette) may change based on the computed total power score. For example, the power optimization engine 216 may interface with the model constructor 207 so that only those blocks that when used in the model keep the total power score below the specified threshold may be available to the user.

In an embodiment, the evaluation engine 212 may compute a total score in response to a command, such as a user-initiated command or a programmatic command. For example, the user may direct the evaluation engine 212 to compute a total score for the model 400 at various points during the model's construction, instead of having the total power score being updated continuously and/or in response to model construction operations. In another embodiment, the evaluation engine 212 may compute a total score when the model 400 is executed.

The power score evaluation engine 212 may analyze only those blocks of the model 400, 500 that are designated for implementation in hardware. For example, the user may designate one or more blocks or subsystems of a model for implementation in hardware. Information regarding this designation may be incorporated into the PIR, and thus accessed by the evaluation engine 212 when computing a power score for the model.

Power Optimization

FIGS. 7A-D is a flow diagram of a method in accordance with an embodiment of the invention. The power optimization engine 216 may parse the model as it is being constructed, and the IR builder 208 may generate one or more IRs, as indicated at block 702. For example, the power optimization engine 216 also may examine one or more of the IRs as they are being constructed by the IR builder 208. The optimization engine 216 may identify portions of the model 400 that, if modified, may result in a reduction of the total power score, as indicated at block 704. In an embodiment, the modifications suggested by the power optimization engine 216 do not alter the functionality of the model 400. That is, the model 400, as modified by the suggested changes, produces the same results as the original model 400. The determination of a suggested, power conserving change to the model 400 may be based on information in the one or more transmutation modules 217a, b. Reducing power consumption may be considered an optimization of power consumption.

Rate Transition

A first transmutation module 217a may assist the optimization engine 216 in identifying sections or portions of the model 400 that operate at different rates relative to each other, as indicated at block 706, and whether one or more blocks or components may be moved across such a rate boundary so as to reduce the model's power consumption, as indicated at block 708.

For example, with reference to the model 500 illustrated in FIG. 5, the optimization engine 216 may determine that the first portion 508 of the model 500 operates at a first rate, while the second portion 510 operates at a second rate that is faster than the first rate. Starting from the boundary between the two portions 508, 510, the optimization engine 216 may examine the blocks in the portion 510 operating at the faster rate. It should be understood that the optimization engine 216 may examine the nodes of the PIR. The engine 216 may determine whether one or more of these blocks may be moved to the portion 508 operating at the slower rate, while still preserving the results being computed. That is, the original, user-constructed model 500 and the modification proposed by the engine 216 produce equivalent numerical results. If the engine 216 identifies such a block, it may notify the user of the suggested change, as indicated at block 710. The notification may take the form of an annotation to the model 500 as presented on the display 120. For example, the identified block may be made to flash or blink. Alternatively, a change in color, the addition of a shadow, the addition of a power savings symbol, or other visual cue may be provided to the user. In other embodiments, other cues, such as audio cues, may be employed.

In an embodiment, the user may request additional information regarding the suggested change, as indicated at block 712. For example, the user may enter a command requesting additional information, such as by selecting, e.g., with the mouse 118, the flashing block. In response, the UI engine 204 may present a drop down menu offering to present the additional information through alternative forms, as indicated at block 714. For example, the UI engine 204 may provide the user with the option of receiving a textual description of the proposed change that, if made to the model 500 by the user, would reduce the model's power score. Alternatively or additionally, the UI engine 204 may provide the user with the option of being presented with a new model that incorporates the suggested change resulting in the lower power score. If the user requests the textual description, the UI engine 204 may present a text box (not shown) on the display 120 that includes a written description of the proposed changes that could be made to the model 500, as indicated at block 716.

Figure 7A:
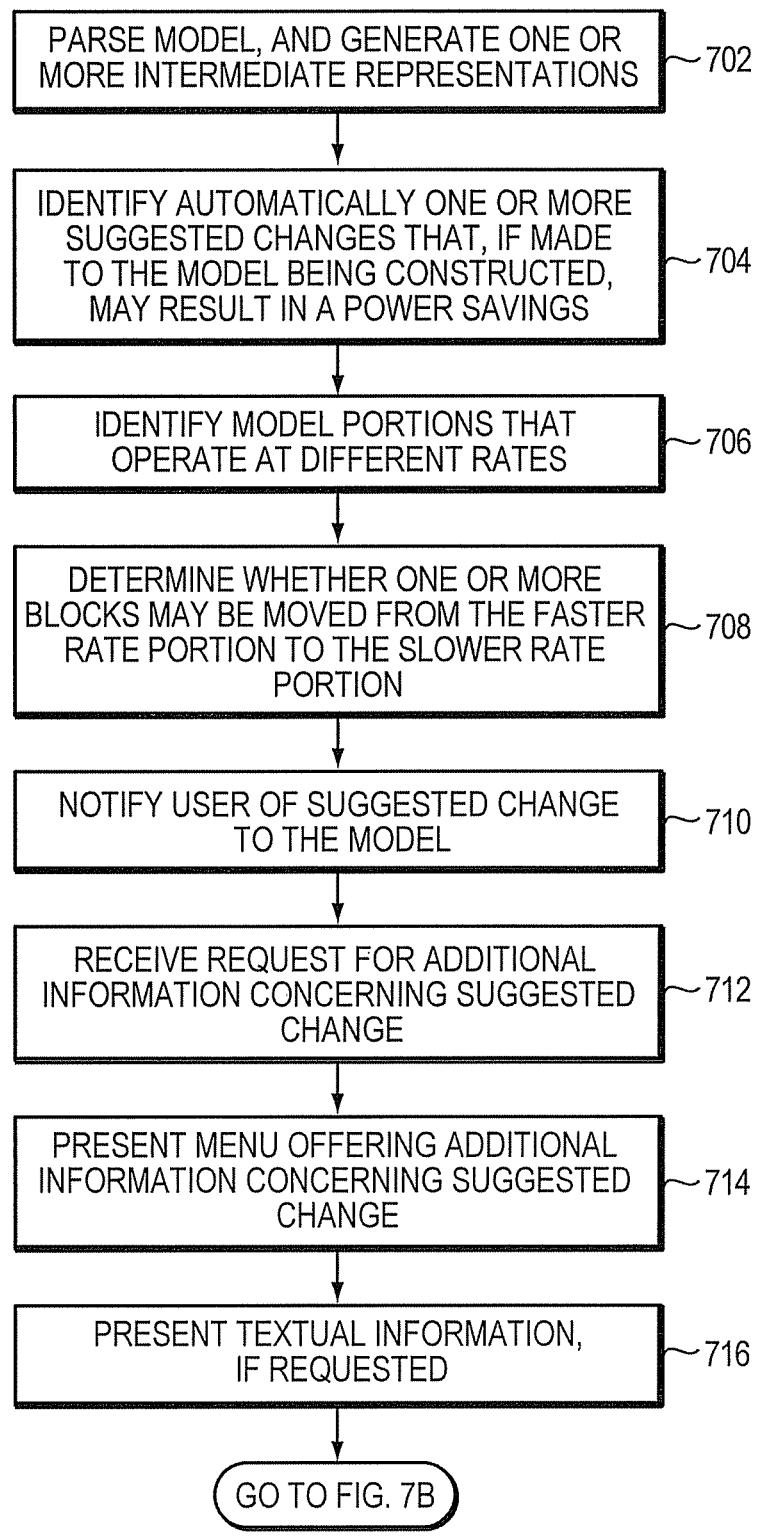
FIGS. 7A-D is a flow diagram of a method in accordance with an embodiment of the present invention.
Figure 7B:
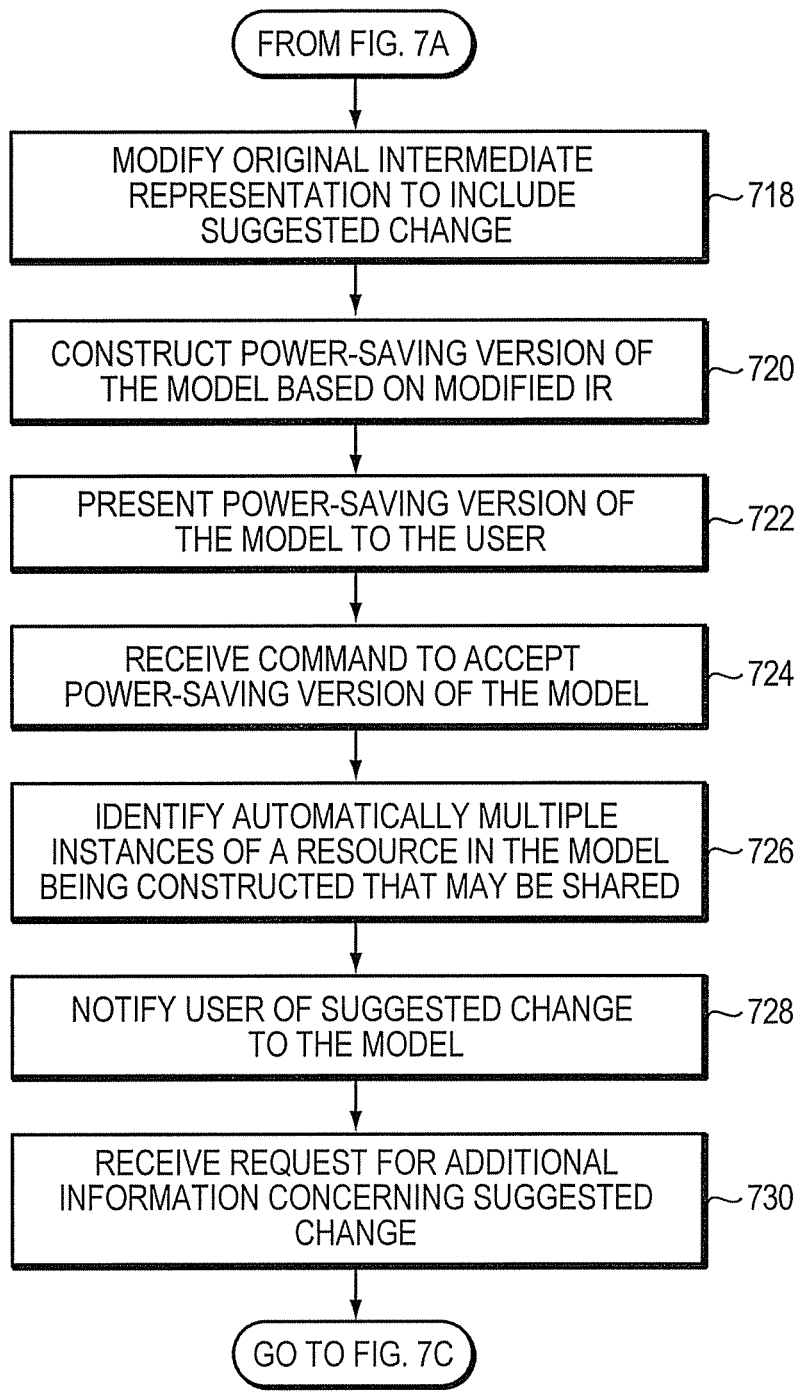

If the user requests the reduced power model, the power optimization engine 216 may interface with the IR builder 208 so as to modify the original IR to include the suggested change, as indicated at block 718 (FIG. 7B). In an embodiment, the original IR created for the user-constructed model 500 may be retained in memory, and a new IR may be constructed that includes the proposed changes. The model constructor 207 may build a new executable graphical model based on the changed IR, as indicated at block 720. This reduced power model may then be presented, e.g., on the display 120, for examination and evaluation by the user, as indicated at block 722.

A suitable technique for constructing a model from an IR is described in commonly owned U.S. Patent Publication No. 2007/0261040 for a System and Method for Transforming Graphical Models, which is hereby incorporated by reference in its entirety.

Figure 8:
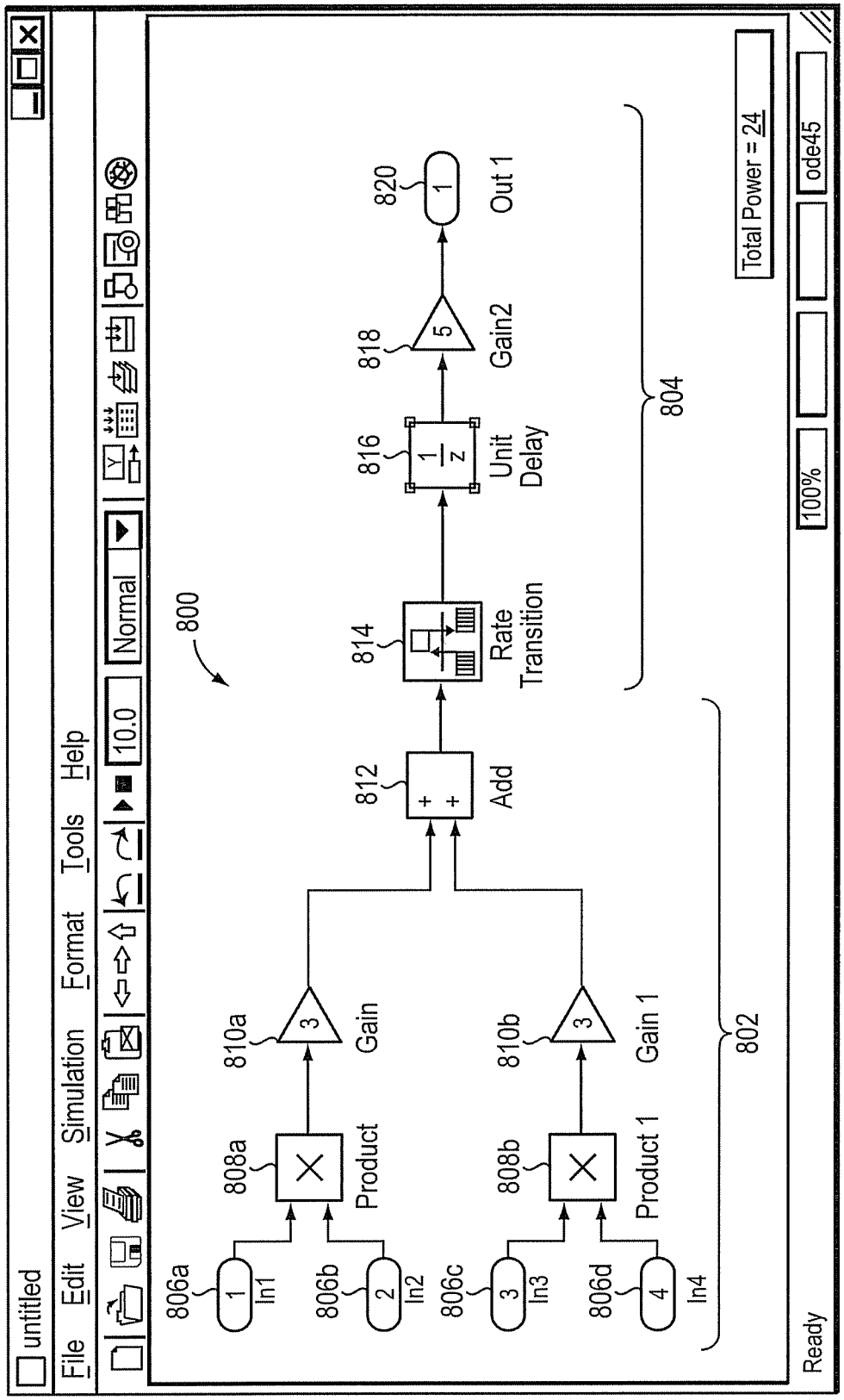
FIG. 8 is an illustration of a graphical model with reduced power consumption.

FIG. 8 is a schematic illustration of an executable graphical model 800, which represents a version of the model 500 with reduced power consumption by moving one or more blocks between different rate regions. As with the model 500, the model 800 also has a first region 802 and a second region 804 that operate at different rates relative to each other. In particular, the second region 804 operates at a faster rate than the first region 802. The first region 802 includes four Inport blocks 806*a-d*, two Product blocks 808*a-b*, and two Gain blocks 810*a-b*. The first region 802 also includes an Add block 812, which corresponds to the Add block 412 (FIG. 5) of the model 500 constructed by the user. That is, the Add block 412, which was located in the faster rate region 504 of model 500, is now located in the slower rate region 802 of the reduced power model 800. In addition the reduced power model 800 includes a single Rate Transition block 814, whereas the user-constructed model 500 included two Rate Transition blocks 408*a-b*. The model 800 also includes a Unit Delay block 816, a Gain block 818, and an Outport block 820, each of which is located in the faster rate region 804.

In an embodiment, the UI engine 204 may provide a command button that, if selected by the user, accepts the proposed changes as represented by the reduced power model 800, as indicated at block 724. Upon acceptance of the proposed changes by the user, the original, user-constructed model 500 may be replaced in favor of the reduced power model 800. Thereafter, the user may make further edits and revisions to the reduced power model 800. Alternatively, the user may reject the proposed changes represented by reduced power model 800, and continue working with the original model 500. For example, another command button may be provided by the UI engine 204 that allows the user to reject the proposed changes represented by the reduced power model 800.

As discussed above, the power optimization engine 216 may monitor one or more of the IRs as they are being constructed by the IR builder 208 in response to user initiated edits. As a result, the user may be alerted to the suggested power saving change as soon as the user makes a modification to the model 500 that, if changed, may result in a power savings. For example, referring to FIG. 4, after a user includes the Add block 410 to the model 400 being constructed, the power optimization engine 216 may alert the user that a power savings opportunity exists. More specifically, the power optimization engine 216 may provide a hint or notification to the user, suggesting that the Add block 410 be moved to a slow rate region, as indicated in FIG. 8.

Resource Sharing

Figure 7C:
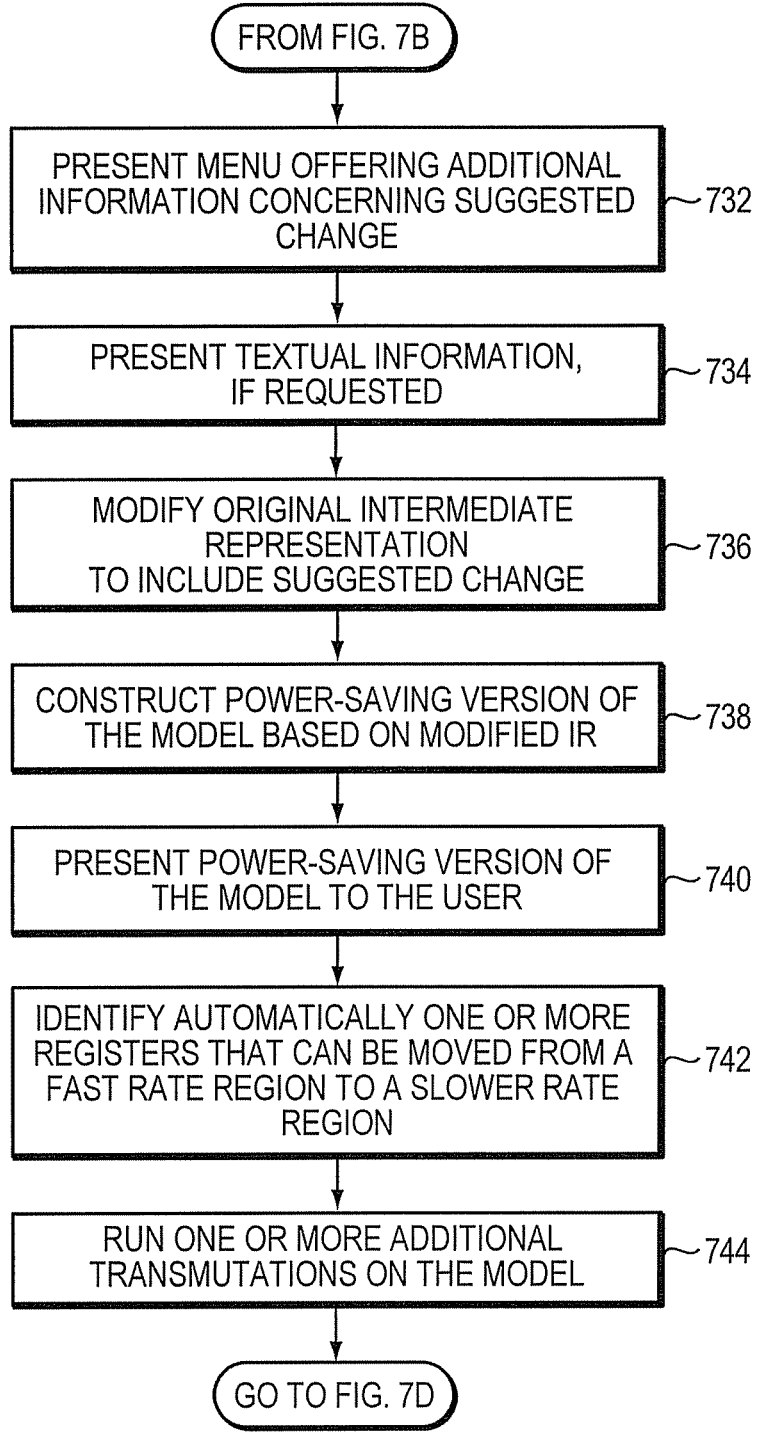
Figure 7D:
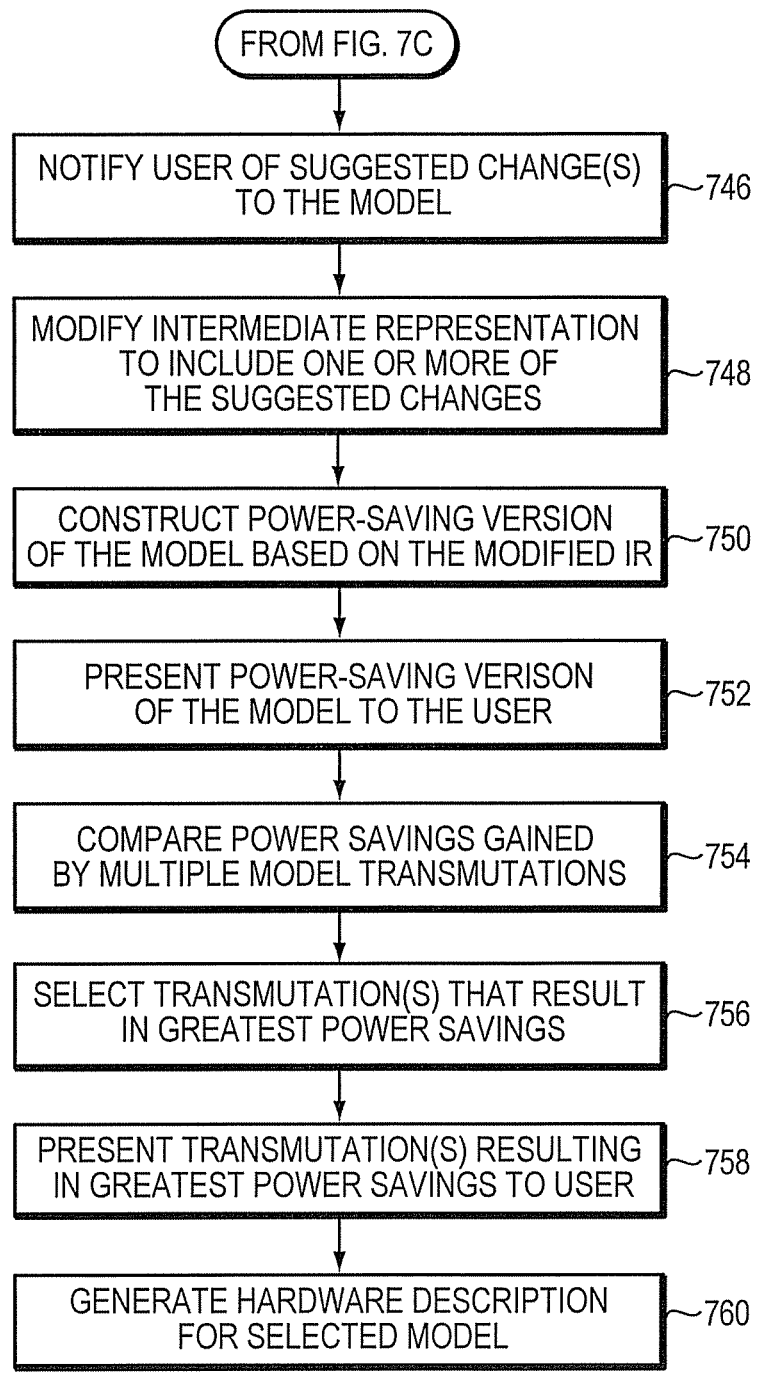

The power optimization engine 216 also may evaluate the IR as it is being constructed to identify opportunities to reduce power consumption through resource sharing transmutations, as indicated at block 726. In particular, the second transmutation module 217*b* may be utilized by the power optimization engine 216 to identify multiple instances of a resource in the model 400, 500 that may be shared. That is, engine 216 may search one or more of the IRs to determine whether multiple blocks of the same type can be replaced with a single block of that type. Again, with reference to the user-constructed model 500 (FIG. 5), the power optimization engine 216 may determine that the two Product blocks 404*a-b* may be replaced by a single Product block, and that the two Gain blocks 406*a-b* may be replaced by a single Gain block. In response to detecting such a proposed, power saving change, the UI engine 204 may notify the user, as indicated at block 728. As discussed above, the user may request additional information regarding the suggested change, as indicated at block 730. In response, the UI engine 204 may present a drop down menu, for example, on the display 120, offering additional information to the user regarding the proposed change, as indicated at block 732 (FIG. 7C). If the user selects a textual description of the proposed change, the UI engine 204 may present a text box (not shown) that includes a written description of the proposed changes, as indicated at block 734.

If the user selects a revised model option, the power optimization engine 216 may interface with the IR builder 208 in order to modify the IR to incorporate the suggested power savings change, as indicated at block 736. The model constructor 207 may build a reduced power model based on the changed IR, as indicated at block 738. This reduced power model may then be presented to the user, e.g., on the display 120, for examination and evaluation, as indicated at block 740.

Figure 9:
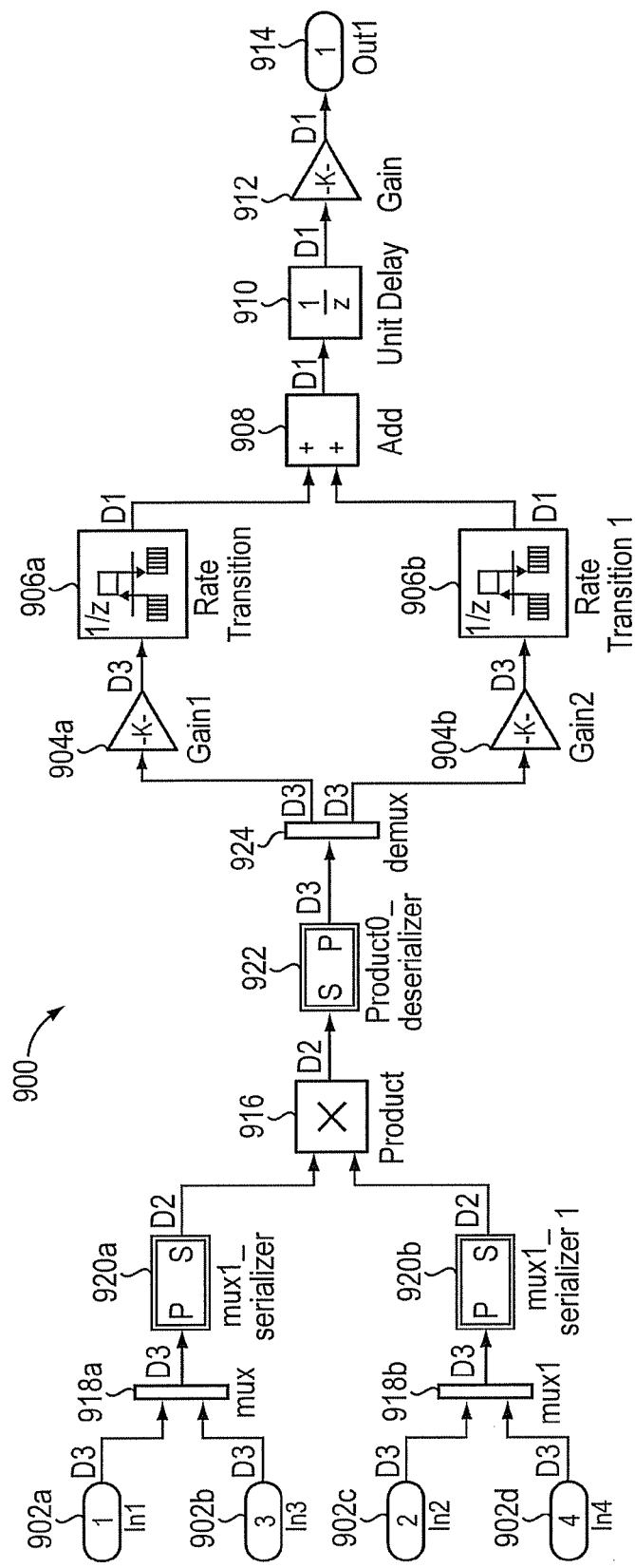
FIG. 9 is an illustration of a graphical model with reduced power consumption.

FIG. 9 is schematic illustration of a model 900, which is a version of the model 500 (FIG. 5) with reduced power consumption through a resource sharing transmutation. The reduced power model 900, like the original model 500, includes four Inport blocks 902*a-d*, two Gain blocks 904*a-b*, two Rate Transition blocks 906*a-b*, an Add block 908, a Unit Delay block 910, another Gain block 912, and an Outport block 914. Unlike the original model 500, which included two Product blocks 404*a-b*, the reduced power model 900 only includes a single Product block 916. The reduced power model 900 includes several additional blocks. Specifically, the model 900 includes two Mux blocks 918*a-b*, two Serializer blocks 920*a-b*, a Deserializer block 922, and a Demux block 924.

A suitable process for identifying resources that may be shared is described in commonly owned, co-pending U.S. patent application Ser. No. 12/963,371, filed Dec. 8, 2010 for a Resource Sharing Workflows within Executable Graphical Models.

By replacing multiple blocks with a shared block, the hardware description generated from the model may have fewer elements and may thus consume less power when operated.

Register movement across rate transition:

Additionally, the power optimization engine 216 may evaluate the IR as it is being constructed to identify opportunities to reduce power consumption by moving registers across rate transition boundaries, as indicated at block 742. In particular, a third transmutation module (not shown) may be utilized by the power optimization engine 216 to identify one or more registers that may be moved across a rate transition boundary. That is, engine 216 may search one or more of the IRs to locate one or more registers located in a fast-rate region that can be moved to a slow-rate region. Engine 216 may also determine whether multiple registers in the fast-rate region can be replaced with just a single register in the slow-rate region. In response to detecting such a proposed, power saving change, the UI engine 204 may notify the user, and the user may request additional information regarding the suggested change. For example, the user may request a textual and/or graphical description or indication of the proposed change. If the user requests a revised model, the power optimization engine 216 may interface with the IR builder 208 in order to modify the IR to incorporate the suggested power savings change, and the model constructor 207 may build a reduced power model based on the changed IR. This reduced power model may then be presented to the user, e.g., on the display 120, for examination and evaluation.

Figure 10:
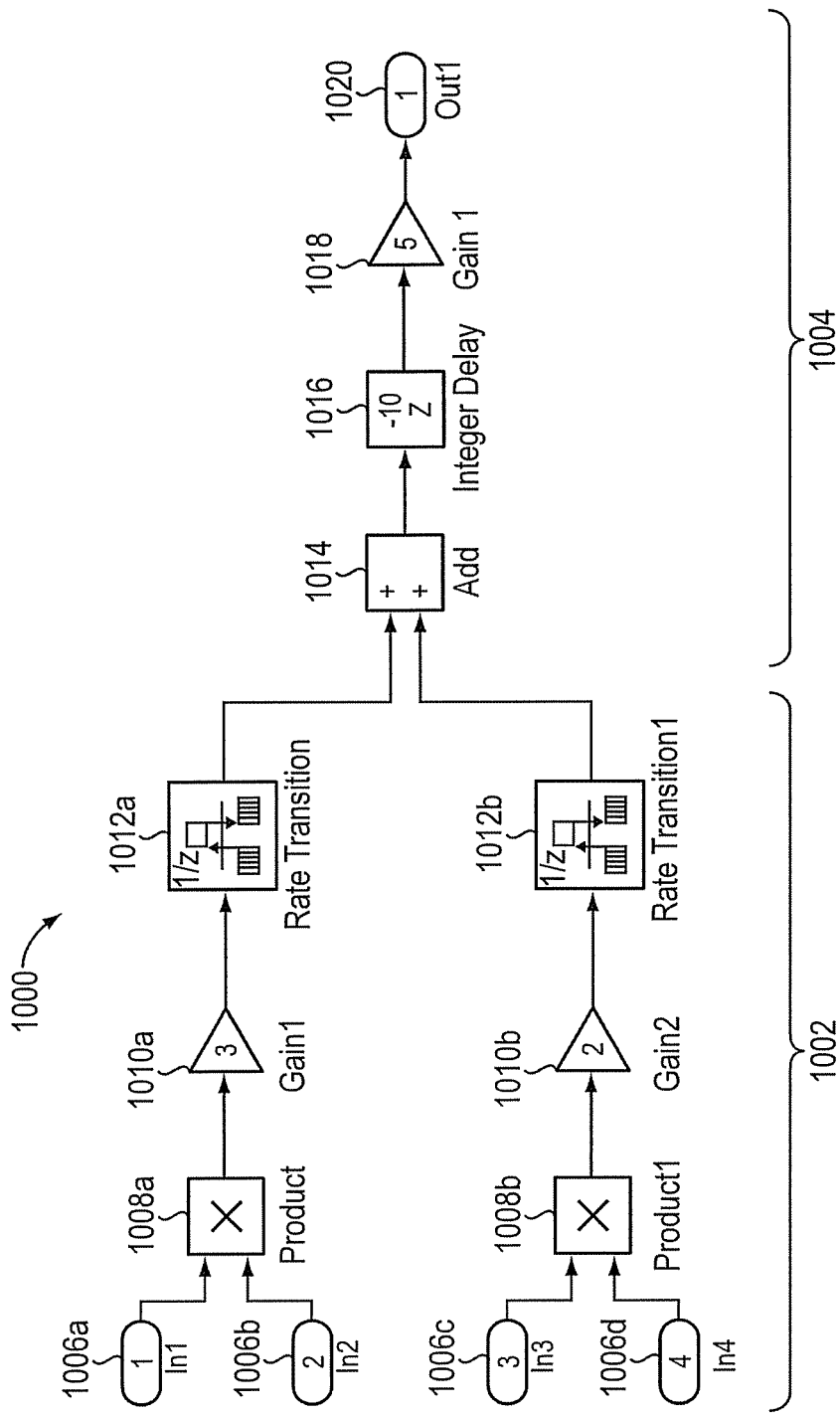
FIG. 10 is an illustration of an exemplary graphical model.

FIG. 10 is a schematic illustration of a source graphical model 1000 that may be evaluated by the power optimization engine 216. The model 1000 has a first region 1002 and a second region 1004 that operate at different rates relative to each other. In particular, the second region 1004 operates at a faster rate than the first region 1002. The first region 1002 includes four Inport blocks 1006*a-d*, two Product blocks 1008*a-b*, two Gain blocks 1010*a-b*, and two Rate Transition blocks 1012*a-b*. The second region 1004 includes an Add block 1014, an Integer Delay block 1016, a Gain block 1018, and an Outport block 1020. The Integer Delay block 1016 may be implemented in hardware as one or more registers. The power optimization engine 216 may identify those blocks or other elements of a model that will be implemented through one or more registers, and determine whether such blocks or elements may be moved across a rate transition boundary from a faster rate region to a slower rate region. With reference to FIG. 10, the power optimization engine 216 may identify the Integer Delay block 1016, and determine that it may be moved from the second region 1004 to the first region 1002, which operates at a rate that is slower than the second region 1004. Engine 216 may notify the user of the suggested change involved in moving the Integer Delay block 1016.

Figure 11:
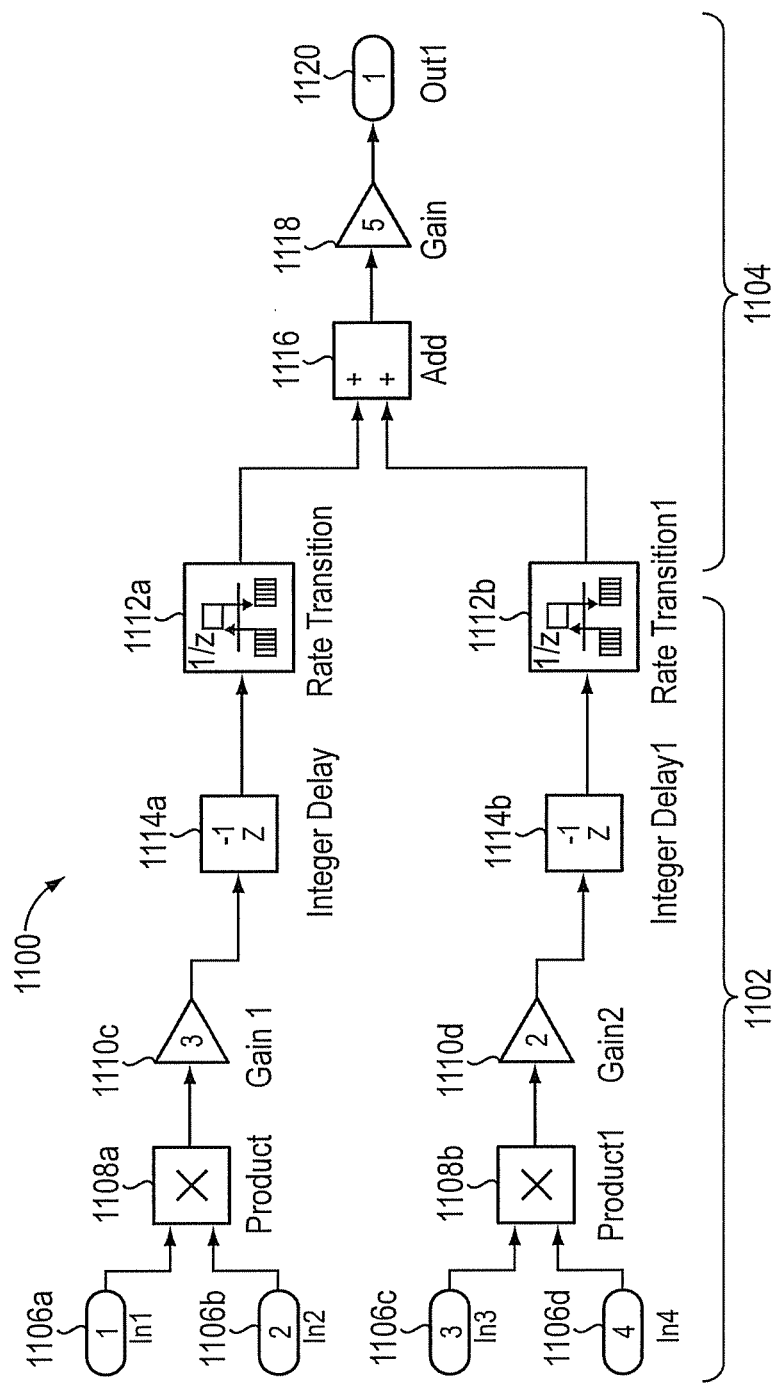
FIG. 11 is an illustration of a graphical model with reduced power consumption.

If the user, upon being notified of the suggested change, requests the creation of a reduced power model, the model constructor 207 may build a reduced power model. FIG. 11 is a schematic illustration of an executable graphical model 1100, which represents a version of the model 1000 with reduced power consumption by moving one or more register-type blocks between different rate regions. As with the model 1000, the model 1100 also has a first region 1102 and a second region 1104 that operate at different rates relative to each other. In particular, the second region 1104 operates at a (10×) faster rate than the first region 1102. The first region 1102 includes four Inport blocks 1106*a-d*, two Product blocks 1108*a-b*, two Gain blocks 1110*a-b*, and two Rate Transition blocks 1112*a-b*. The first region 1102 also includes two Integer Delay blocks 1114*a-b*, which correspond to the one Integer Delay block 1016 (FIG. 10) of the model 1000 constructed by the user. That is, the Integer Delay block 1016, which was located in the faster rate region 1004 of model 1000, is now located in the slower rate region 1102 of the reduced power model 1100.

In addition, the second region 1104 of the reduced power model 1100 includes an Add block 1116, a Gain block 1118, and an Outport block 1120. As shown, no Integer Delay block is included in the second region 1104 of the reduced power model 1100. In an embodiment, the model constructor 207 may manipulate one or more parameters of the register-type blocks being moved across a rate boundary. For example, Integer Delay block 1016 (FIG. 10) may have a delay parameter of 10. Since the second region 1004 operates at a rate that is ten times the rate of the first region 1002, the model constructor 207 should set the delay parameters of the two Integer Delay blocks 1114*a-b* added to the first region 1102 to one. Thus, multiple registers in a high-rate region may also be transformed into a single register in a low-rate region, thereby reducing the number of registers substantially. A reduction in the number of registers directly translates to reducing switching activity, which may result in a power savings.

It should be understood that the power optimization engine 216 may first determine whether the proposed change actually results in a lower power score than the original model. If not, the optimization engine 216 may not notify the user of such a proposed change.

It should be further understood that the rate transition and resource sharing transmutations described herein are intended as exemplary only, and that other transmutations may be applied to the model 400, 500 as constructed by the user. For example, another transmutation may involve a reduction in the bitwidth of data operated upon by one or more of the core components. A suitable process for reducing the bitwidth, which may also be referred to as streaming, is described in commonly owned, co-pending U.S. patent application Ser. No. 12/963,371, filed Dec. 8, 2010 for a Resource Sharing Workflows within Executable Graphical Models. Other such transmutations include constrained retiming (moving registers based on pre-defined user constraints), memory fusion (combining multiple memory elements into one), logic redundancy elimination (eliminating redundant logic), and logic replication (replication of logic for better resource shareability), among others.

To the extent the power optimization engine 216 includes or has access to other transmutations that can be performed, the power optimization engine 216 may run one or more of these other transmutations on the model to determine whether a power savings can be achieved, as indicated at block 744. Engine 216 may notify the user of a suggested change, as indicated at block 746 (FIG. 7D), and among other steps may modify the IR to incorporate the suggested change, may construct a power-savings version of the model, and may present the power-savings version of the model to the user, as indicated at blocks 748, 750, and 752.

In an embodiment, the power optimization engine 216 may automatically explore multiple transmutations, and select those changes that provide the greatest power savings, as indicated at block 754. The changes that result in the greatest power savings may be selected and presented to the user, as indicated at blocks 756 and 758. For example, the optimization engine 216 may first determine the power savings that would be achieved through one or more rate transition transmutations of the original model. The optimizer may then determine the power savings that would be achieved through one or more resource sharing transmutations of the original model. The second and further transmutations may be applied to the original model, or to a power revised model.

In an embodiment, a set of IRs may be selected, such as the set of IRs having the same reduced power score. Alternatively, a set of IRs having a certain characteristic may be selected. For example, the five IRs having the lowest power scores may be selected.

The user may choose a selected model for hardware generation, and in response, the hardware description generator 218 may produce a hardware description for the selected model, as indicated at block 760. The hardware description may be in the form of generated Hardware Description Language (HDL) code, such as VHDL, Verilog, and SystemC, among others. The hardware description generator 218 may include a compiler for producing the hardware description.

The generated HDL code can be exported to synthesis and layout tools for hardware realization, such as the ModelSim simulation and debug environment from Mentor Graphics Corp of Wilsonville, Oreg., or the Synplify family of synthesis tools from Synplicity, Inc. of Sunnyvale, Calif., among others.

It should be understood that further power reductions and/or optimizations may be achieved by the synthesis and layout tools.

Figure 12:
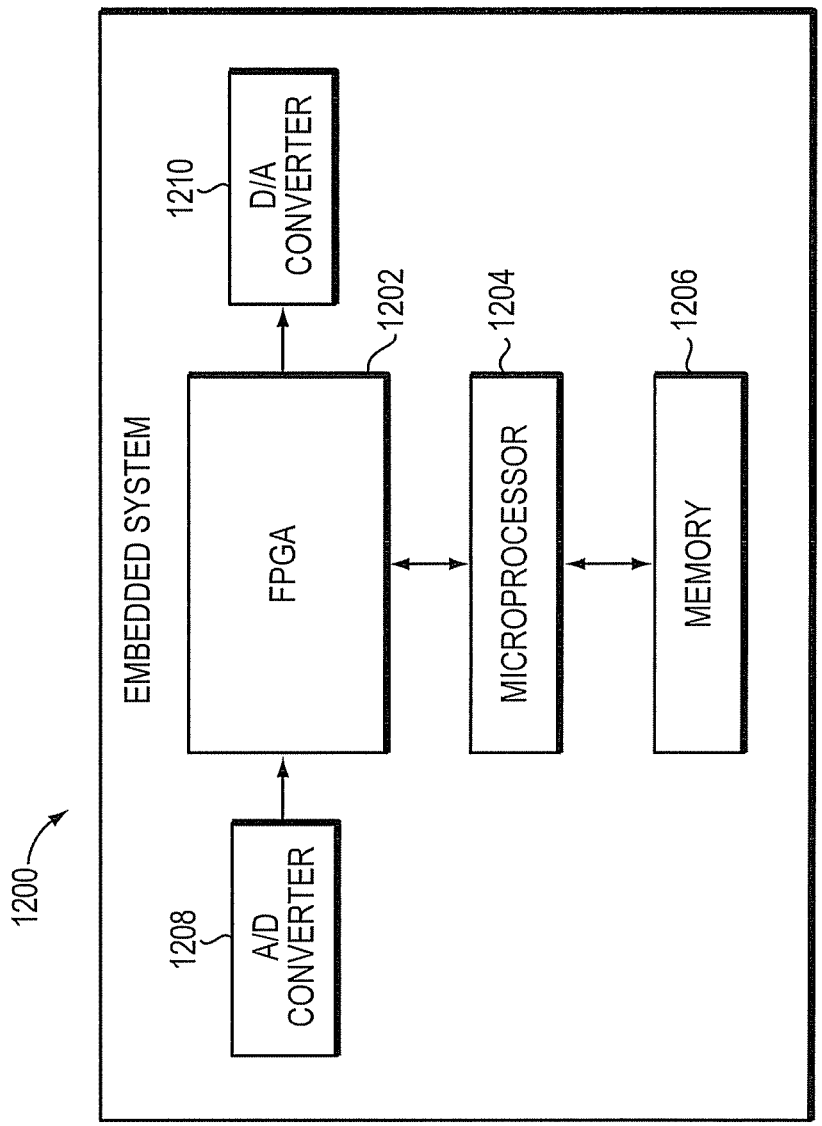
FIG. 12 is a schematic illustration of an embedded system.

FIG. 12 is a schematic illustration of an embedded system 1200. The embedded system 1200 may include a target hardware element, such as an FPGA 1202, a microprocessor 1204, such as a Digital Signal Processor (DSP), and a memory 1206. The embedded system 1200 may also include one or more analog components, such as an Analog-to-Digital (A/D) converter 1208, and a Digital-to-Analog (D/A) converter 1210. The embedded system 1200 of FIG. 12 is intended for illustrative purposes only, and the present invention may be used with other embedded system designs. For example, the embedded system 1200 may include a general purpose processor in addition to or in place of the microprocessor 1204. In addition, the embedded system 1200 may include additional components, fewer components, or different components than are shown in FIG. 12. Moreover, embedded system 1200 may include components arranged in configurations that differ from the configuration of FIG. 12. An executable graphical model may be created by a user that includes one or more portions to be run on the target hardware element 1202, and one or more portions to be run by the microprocessor 1204.

The FPGA 1202 may be configured using a power reduced hardware description generated by the code generation system 210. For example, a synthesis tool may be used to configure the FPGA 1202 from the generated hardware description. When executed, the FPGA 1202 may consume power that is consistent with the total aggregate power score computed by the power score evaluation engine 212.

In an embodiment, the code generation system 210 may interface with other power computation modules (not shown). These other power computation modules may be external to the high-level modeling environment 200, such as external synthesis and layout tools, or they may be part of the high-level modeling environment 200, such as an add-on tool or toolbox.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, in addition to or instead of executable graphical models, the invention may be used with graphical models having executable semantics, such as models created using Architecture Analysis and Design Language (AADL), Uniform Modeling Language (UML), and/or SysML tools. In addition, the generated code may include fixed-point code to run on a fixed-point processor, or code to emulate fixed-point behavior on a floating-point processor. Therefore, it is the object of the appended claims to cover all such variations and modifications as come within the true spirit and scope of the invention.

What is claimed is:

1. A method comprising:

accessing a graphical model having executable semantics, the graphical model created in a graphical modeling environment that defines
  core components that represent base level operations of the graphical modeling environment and, when executed by the graphical modeling environment, perform base level operations, and
  high-level graphical blocks that represent high-level functions of the graphical modeling environment relative to the core components and, when executed by the graphical modeling environment perform the high-level functions, the high-level graphical blocks formed from combinations of the core components,
the graphical model including a first set of the core components defined within the graphical modeling environment, and
the graphical model having a functional behavior;
accessing power scores assigned to the core components defined within the graphical modeling environment;
computing, by a processor, a total power score for the graphical model, the total power score
  being a function of the power scores assigned to the first set of the core components included in the graphical model, and
  determined without translation of the graphical model into a low-level hardware design form;
automatically performing at least one transmutation to the graphical model, the at least one transmutation automatically creating a modified graphical model, the modified graphical model
  having a functional behavior equivalent to the functional behavior of the graphical model, and
  including a second set of the core components defined within the graphical modeling environment;
computing, by the processor, a total power score for the modified graphical model, the total power score for the modified graphical model being a function of the power scores assigned to the second set of the core components included in the modified graphical model, the total power score for the modified graphical model being less than the total power score computed for the graphical model; and
performing at least one of
  presenting a visual representation of the modified graphical model on an output device, or
  generating a hardware description for the modified graphical model.

2. The method of claim 1 wherein
the graphical model includes first and second regions, the second region operating at a higher rate than the first region, and
the at least one transmutation modifies the graphical model by moving one or more of the particular core components from the second region to the first region.

3. The method of claim 1 wherein the power scores assigned to the core components are:
represented using non-dimensional values, and
independent of target hardware.

4. The method of claim 1 further comprising:
automatically performing a plurality of transmutations to the graphical model;
computing a total power score for each of the plurality of transmutations performed on the graphical model;
comparing the computed total power scores; and
selecting the transmutation from the plurality of transmutations that produces the lowest computed total power score.

5. The method of claim 4 further comprising:
presenting the selected transmutation to a user.

6. The method of claim 5 where the selected transmutation is presented through a revised version of the graphical model.

7. The method of claim 1 further comprising:
providing a plurality of data structures, each data structure storing a set of power scores for the core components;
receiving a selection of a given data structure; and
utilizing the set of power scores stored in the given data structure in computing the total power score for the graphical model.

8. The method of claim 1 wherein the total power score computed for the graphical model is non-denominational.

9. The method of claim 1 wherein the low-level hardware design form is a Register Transfer Level (RTL) form.

10. The method of claim 1 further comprising:
storing the total power score computed for the graphical model in a memory.

11. A method comprising:
constructing a graphical model having executable semantics in a graphical modeling environment that defines
core components that represent base level operations of the graphical modeling environment and, when executed by the graphical modeling environment, perform the base level operations, and
high-level graphical blocks that represent high-level functions of the graphical modeling environment relative to the core components and, when executed by the graphical modeling environment perform the high-level functions, the high-level graphical blocks formed from combinations of the core components, the graphical model
having a behavior, and
including a first set of the core components defined within the graphical modeling environment;
accessing power scores assigned to the core components defined within the graphical modeling environment;
computing, by a processor, a total power score for the graphical model, the total power score
being a function of the assigned power scores for the first set of the core components included in the graphical model, and
determined without translation of the graphical model into a low-level hardware design form;
automatically updating the total power score while the graphical model is being constructed in the graphical modeling environment;

performing at least one transmutation to the graphical model, the at least one transmutation creating a modified graphical model that preserves the behavior of the graphical model, the modified graphical model having a second set of the core components;
computing, by the processor, a total power score for the modified graphical model, the total power score for the modified graphical model being a function of the power scores assigned to the second set of the core components, the total power score for the modified graphical model being less than the total power score computed for the graphical model; and
displaying the total power score computed for the modified graphical model.

12. The method of claim 11 further comprising:
presenting the modified graphical model on a display.

13. The method of claim 11 further comprising:
generating a hardware description from the modified graphical model.

14. The method of claim 11 wherein the low-level hardware design form is a Register Transfer Level (RTL) form.

15. A non-transitory computer readable medium comprising program instructions, the program instructions when executed by one or more processors operable to:
receive a graphical model having executable semantics, the graphical model adapted to make use of:
core components that represent base level operations and, when executed, perform the base level operations, and
high-level graphical blocks that represent high-level functions relative to the core components and, when executed, perform the high-level functions, the high-level graphical blocks formed from combinations of the core components, the graphical model
including a first set of the core components, and
having a functional behavior;
access power scores assigned to the core components;
compute a total power score for the graphical model, the total power score
being a function of the power scores assigned to the first set of the core components included in the graphical model, and
determined without translation of the graphical model into a low-level hardware design form;
perform automatically at least one transmutation on the graphical model, the at least one transmutation automatically creating a modified graphical model having a functional behavior equivalent to the functional behavior of the graphical model;
compute a total power score for the modified graphical model, the total power score for the modified graphical model being less than the total power score computed for the graphical model; and
issue one or more notifications related to the at least one transmutation performed on the graphical model.

16. The non-transitory computer readable medium of claim 15 wherein the low-level hardware design form is a Register Transfer Level (RTL) form.

17. A non-transitory computing-device readable media comprising instructions executable by a computing device to:
receive one or more user inputs specifying at least a portion of a graphical model having executable semantics, the one or more user inputs received in a graphical modeling environment that defines
core components that represent base level operations of the graphical modeling environment and, when executed by the graphical modeling environment, perform the base level operations, and high-level graphical blocks that represent high-level functions of the graphical modeling environment relative to the core components and, when executed by the graphical modeling environment, perform the high-level functions, the high-level graphical blocks formed from combinations of the core components, the at least a portion of a graphical model, when executed, producing one or more results;

calculate a power consumption value for the at least a portion of a graphical model, the power consumption value being a function of power scores assigned to one or more of the core components defined by the graphical modeling environment, and determined without translation of the at least a portion of a graphical model into a low level hardware design form;

determine automatically a suggested change to the at least a portion of a graphical model that reduces the power consumption value, the suggested change preserving the one or more results produced by the at least a portion of a graphical model; and output at least one of the suggested change, or an indication of the suggested change.

18. The non-transitory computing-device readable media of claim 17 further comprising instructions executable by a computing device to:

present to a user at least one of:

the suggested change, or the indication of the suggested change.

19. The non-transitory computing-device readable media of claim 17 further comprising instructions executable by a computing device to:

identify a predefined pattern within the at least a portion of a graphical model, the suggested change being a modification to the predefined pattern.

20. The non-transitory computing-device readable media of claim 17 further comprising instructions executable by a computing device to:

generate a modified version of the at least a portion of a graphical model; and output the modified version of the at least a portion of a graphical model.

21. The non-transitory computing-device readable media of claim 17 wherein the calculated power consumption value is non-denominational.

22. The non-transitory computing-device readable media of claim 17 wherein the calculated power consumption value is independent of a target hardware device.

23. The non-transitory computer readable medium of claim 17 wherein the low-level hardware design form is a Register Transfer Level (RTL) form.

24. An apparatus comprising:

processing logic coupled to a memory, wherein the processing logic is programmed to:

receive a graphical model having executable semantics and adapted to make use of:

core components that represent base level operations and, when executed, perform the base level operations, and high-level graphical blocks that represent high-level functions relative to the core components and, when executed, perform the high-level functions, the high-level graphical blocks formed from combinations of the core components, the graphical model including a first set of the core components, and having a functional behavior;

access power scores assigned to the core components;

compute a total power score for the graphical model, the total power score being a function of the power scores assigned to the first set of the core components included in the graphical model, and determined without translation of the graphical model into a low-level hardware design form;

automatically perform at least one transmutation to the graphical model, the at least one transmutation automatically creating a modified graphical model, the modified graphical model having a functional behavior equivalent to the functional behavior of the graphical model, and including a second set of the core components;

compute a total power score for the modified graphical model, the total power score for the modified graphical model being a function of the power scores assigned to the second set of the core components included in the modified graphical model, the total power score for the modified graphical model being less than the total power score computed for the graphical model; and at least one of present the modified graphical model on a display, or generate a hardware description for the modified graphical model.

25. The apparatus of claim 24 wherein the at least one transmutation involves at least one of:

moving a first core component of the first set of the core components from a faster rate region to a slower rate region;

reducing a bit width of data processed by a second core component of the first set of the core components, and replacing multiple instances of a third core component of the first set of the core components with a single instance.

26. The apparatus of claim 24 wherein the total power score computed for the graphical model is non-denominational.

27. The apparatus of claim 24 wherein the low-level hardware design form is a Register Transfer Level (RTL) form.

* * * * *